US011893146B2

(12) United States Patent
Cherukuri et al.

(10) Patent No.: US 11,893,146 B2
(45) Date of Patent: Feb. 6, 2024

(54) TAMPER DETECTION TECHNIQUES

(71) Applicant: Arm Limited, Cambridge (GB)

(72) Inventors: Venkata Niranjan Cherukuri, Bangalore (IN); Srinivasan Balakrishnan, Bangalore (IN); Chirumamilla Lakshmana Rao, Bangalore (IN)

(73) Assignee: Arm Limited, Cambridge (GB)

( * ) Notice: Subject to any disclaimer, the term of this patent is extended or adjusted under 35 U.S.C. 154(b) by 666 days.

(21) Appl. No.: 16/809,422

(22) Filed: Mar. 4, 2020

(65) Prior Publication Data
US 2021/0279373 A1    Sep. 9, 2021

(51) Int. Cl.
*G06F 21/86*     (2013.01)
*G01R 19/00*     (2006.01)
*G01R 19/12*     (2006.01)
*G01R 27/04*     (2006.01)
*G08B 21/00*     (2006.01)

(52) U.S. Cl.
CPC ......... *G06F 21/86* (2013.01); *G01R 19/0038* (2013.01); *G01R 19/12* (2013.01); *G01R 27/04* (2013.01); *G08B 21/00* (2013.01)

(58) Field of Classification Search
CPC ... G06F 21/86; G06F 21/554; G01R 19/0038; G01R 19/12; G01R 27/14; G08B 21/00; G08B 13/128
USPC .......................................................... 726/34
See application file for complete search history.

(56) References Cited

U.S. PATENT DOCUMENTS

| 4,860,351 A | 8/1989 | Weingart | |
|---|---|---|---|
| 5,298,884 A | 3/1994 | Gilmore et al. | |
| 2006/0231633 A1* | 10/2006 | Farooq | H01L 23/10 235/492 |
| 2008/0001741 A1* | 1/2008 | Cobianu | B60R 25/1004 340/568.2 |
| 2016/0211843 A1* | 7/2016 | Wang | H03K 19/003 |
| 2017/0124374 A1* | 5/2017 | Rowe | B60R 25/1004 340/568.2 |

FOREIGN PATENT DOCUMENTS

GB    2412996 A    10/2005

OTHER PUBLICATIONS

Active Shiels; INVIA; printed Jan. 3, 2020. https://www.invia.fr/pages/products/active-shield.aspx.
Arora; Don't trust your tamper detection circuitry, it may be dumb?; EDN; printed Sep. 10, 2019. https://www.edn.com/electronics-blogs/beyond-bits-and-bytes/4391255/Don-t-trust-your-tamper-detection-circuitry-it-may-be-dumb/.
(Continued)

*Primary Examiner* — Omar Casillashernandez
(74) *Attorney, Agent, or Firm* — Pramudji Law Group PLLC; Ari Pramudji

(57) ABSTRACT

Various implementations described herein are related to a device having sensing circuitry that receives an input signal and provides an output signal based on sensing a resistance differential between multiple shield resistors or based on sensing a change in voltage across a shield wire of a shield wiring network. The device includes comparing circuitry that receives the output signal and provides an alarm signal based on detecting a tampering event associated with the resistance differential or the change in voltage.

9 Claims, 17 Drawing Sheets

(56) References Cited

OTHER PUBLICATIONS

Mun et al.; Secure Integrated Circuit with Physical Attack Detection based on Reconfigurable Top Metal Shield; Journal of Semiconductor Technology and Science; vol. 19, No. 3; Jun. 2019. https://doi.org/10.5573/JSTS.2019.19.3.260.
Immler et al.; Secure Physical Enclosure from Covers with Tamper-Resistance; IACR Transactions on Cryptographic Hardware and Embedded Systems; vol. 2019, No. 1; pp. 51-96; Nov. 9, 2018. DOI: https://doi.org/10.13154/tches.v2019j1.51-96.
Wang, et al.; Probing Attacks on Integrated Circuits: Challenges and Research Opportunities; IEEE Design & Test 2017; Sep. 13, 2017. DOI: 10.1109/MDAT.2017.2729398.
Shahrjerdi et al.; Shielding and Securing Integrated Circuits with Sensors; 2014 IEEE/ACM International Conference on Computer-Aided Design (ICCAD); Nov. 2014.
Cioranesco, et al.; Cryptographically secure shields. HOST 2014; IEEE; pp. 25-31; May 2014. DOI: 10.1109/HST.2014.6855563.hal-01110463.
Briais, et al.; Random Active Shield; 2012 Workshop on Fault Diagnosis and Tolerance in Cryptography; Sep. 2012. https://hal.archives-ouvertes.fr/hal-00721569v1.
PCT International Search Report and Written Opinion; PCT/GB2021/050179; dated Jun. 11, 2021.
PCT Partial International Search Report and Written Opinion; PCT/GB2021/050179; dated Apr. 1, 2021.

\* cited by examiner

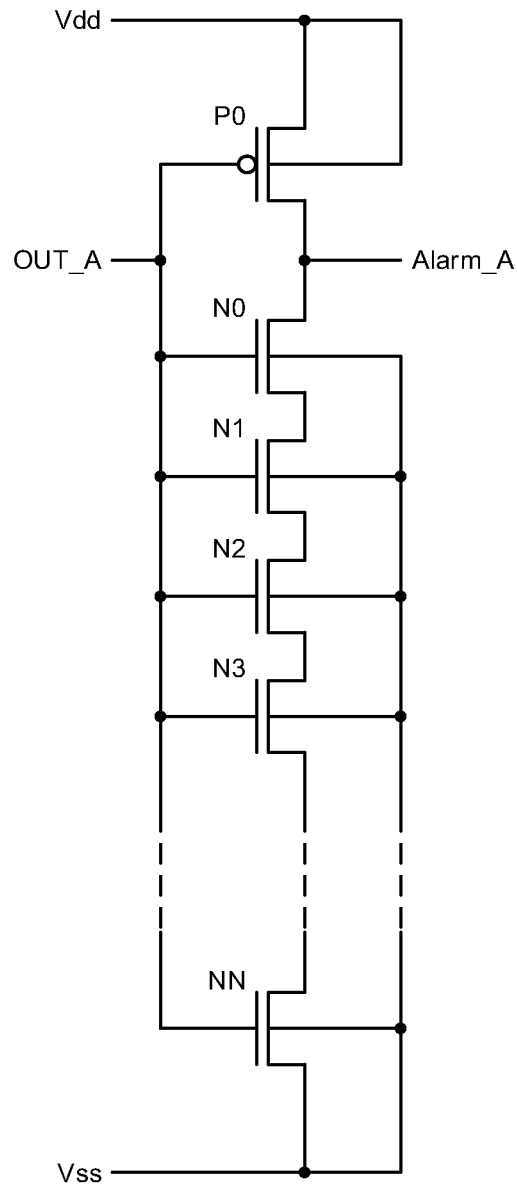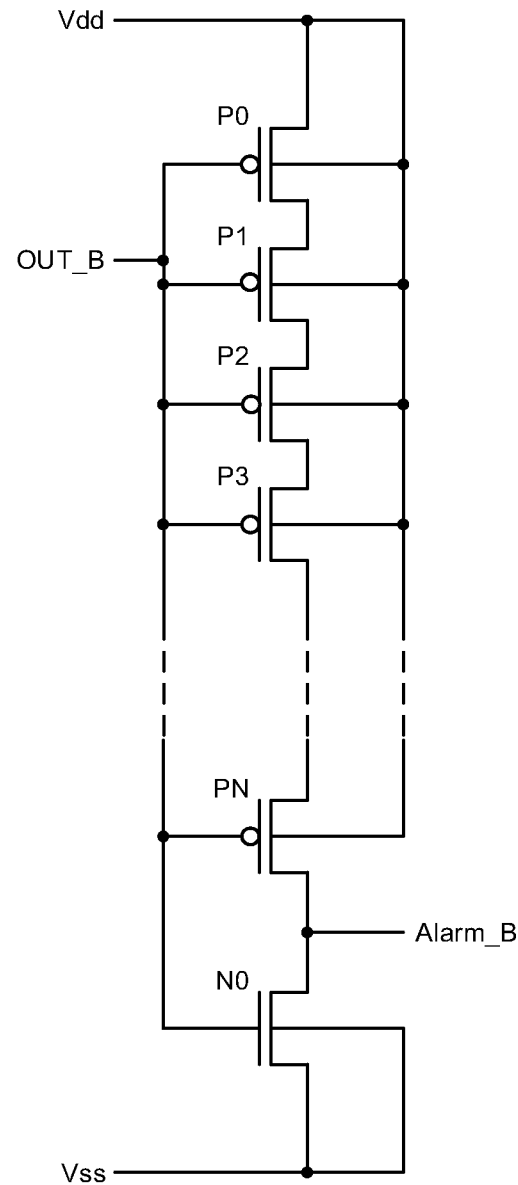
FIG. 7A
FIG. 7B

TAMPER DETECTION TECHNIQUES

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Tamper resistant circuits refer to various methodologies that are used to inhibit, impede and/or detect unapproved access to a device or unauthorized bypass of security logic. Since some devices or computing systems can be unlawfully accessed by persons having sufficient knowledge, equipment, time, etc., a tamper resistant methodology may refer to some resistance to tampering by normal users having physical access to a circuit, device and/or system. In some situations, tamper resistance may refer to simple features, such as anti-tampering devices in specialized drives, or to sophisticated devices that are rendered inoperable with tampering. Thus, in modern industrial applications, there exists a persistent need for anti-tampering measures in circuits, devices and/or systems.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

FIGS. 7A-7B illustrate various diagrams of comparators in accordance with various implementations described herein.

DETAILED DESCRIPTION

There are number of ways to steal secure information stored on a chip, e.g., by physically tampering with the chip and also by probing various access points to retrieve secure information. This may be achieved by severing or cutting metal layers and probing the related net. To protect a chip from this type of attack, a protective metal layer may be disposed to overlie the secured content region so that, if there is any type of malicious tampering, preventative measures may be taken. Accordingly, various implementations described herein are directed to various tamper detection schemes and techniques that provide for highly sensitive physical tampering detection for integrated circuitry in various physical layout designs. For instance, various tamper detection schemes and techniques described herein may provide for a system or device having a unique combination of an operational amplifier and comparator circuit that is configured for detection of tampering with a protective shield layer. The circuit uses resistors that are derived from metal routing segments formed in the shield wiring layout that act as a protective shield layer to protect any logic disposed below the protective shield layer.

In some instances, the various schemes and techniques described herein may provide for a system or device utilizing a low power, low complexity, area efficient on-chip electronic circuit that is configured to detect physical tampering of electronic hardware in integrated circuitry. As described herein, the tamper detection circuitry may be configured to use an analog circuit-based active shield (ASH) that may be implemented with resistors and/or transistors or with any suitable active devices. In some instances, the active shield (ASH) concept may use resistor-based networks in circuits that may be implemented at system or chip level using any technologies, such as CMOS, advanced CMOS, other than CMOS, or discrete electronic hardware in system level applications. In addition, the active shield (ASH) concept may use a sensing element formed of a long wire constructed with various interconnect resources in an integrated circuit (IC) process, such as, e.g., metals, vias, TSVs (Through Silicon Vias), etc. In various instances, physical construction of the long wire may range from a straight line to a complex pattern across multiple layers.

Various implementations of tamper detection schemes and techniques will be described in detail herein with reference to FIGS. 1-8.

Figure 1:
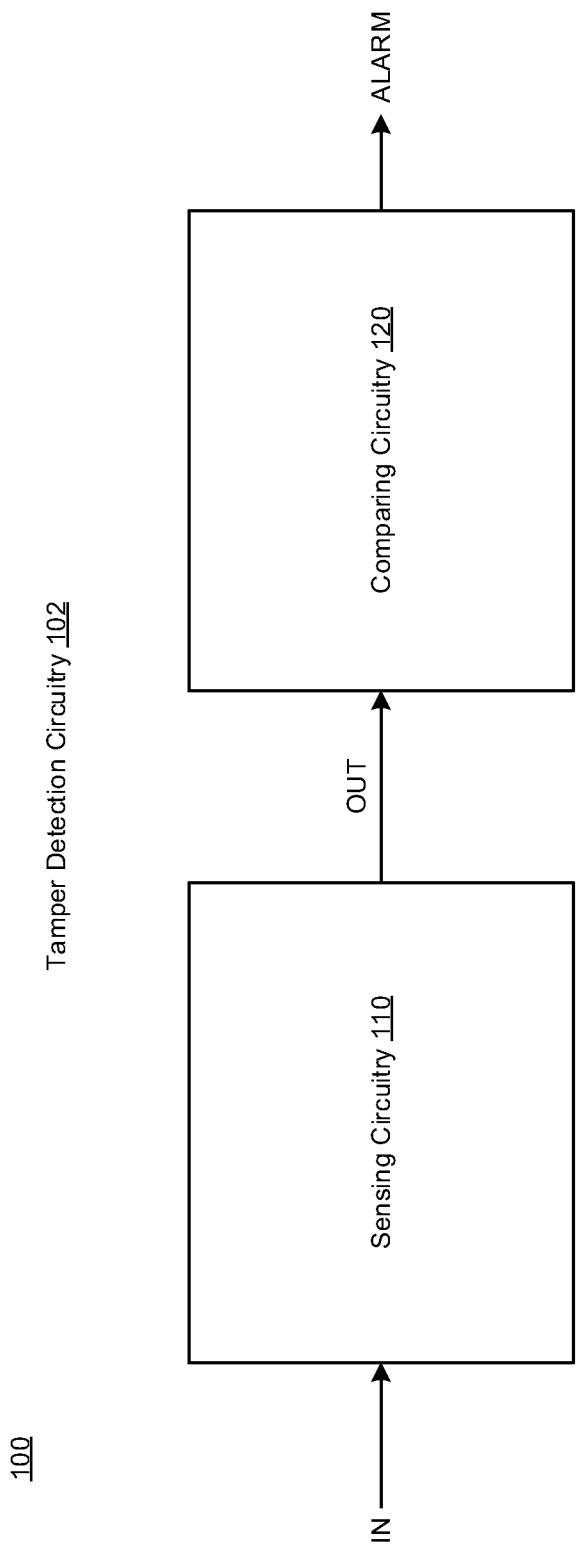
FIG. 1 illustrates a diagram of tamper detection circuitry in accordance with various implementations described herein.

FIG. 1 illustrates a schematic diagram 100 of tamper detection circuitry 102 in accordance with various implementations described herein.

In various instances, the tamper detection circuitry 102 may be implemented as a system or a device having various integrated circuit (IC) components that are arranged and coupled together as an assemblage or combination of parts that provide for a physical layout design and related structures. In some instances, a method of designing, providing and fabricating the tamper detection circuitry 102 as an integrated system or device may involve use of various IC circuit components described herein so as to implement various tamper detection schemes and/or techniques associated therewith. The tamper detection circuitry 102 may be integrated with various computing circuitry and related components on a single chip, and the tamper detection circuitry 102 may be implemented in embedded systems for electronic, mobile and Internet-of-things (IoT) applications.

As shown in FIG. 1, the tamper detection circuitry 102 may include sensing circuitry 110 that is configured to receive an input signal (IN) and provide an output signal (OUT) based on sensing a resistance differential between multiple metal shield resistors disposed in a shield wiring layer. In some instances, the sensing circuitry 110 has at least one operational amplifier and the multiple metal shield resistors that are arranged and configured to receive the input signal (IN) and provide the output signal (OUT) based on sensing the resistance differential between the multiple metal shield resistors of the shield wiring layer. The sensing circuitry 110 and various components associated therewith are described in greater detail herein below with reference to FIGS. 2A-2B.

The tamper detection circuitry 102 may include comparing circuitry 120 that is configured to receive the output signal (OUT) from the sensing circuitry 110 and provide an alarm signal (ALARM) based on detecting at least one tampering event associated with the resistance differential as sensed by the sensing circuitry 110. In some instances, the comparing circuitry 120 has one or more comparators configured to receive the output signal (OUT) from the sensing circuitry 110 and provide the alarm signal (ALARM) based on detecting the at least one tampering event associated with the sensing circuitry 110 sensing the resistance differential between multiple metal shield resistors. The comparing circuitry 120 along with various components associated therewith are described in greater detail herein below with reference to FIG. 3.

In some implementations, detecting the tampering event may refer to detecting a first type of physical alteration (or modification) of the multiple metal shield resistors with a cut, a partial cut or an open formed in one or more metal shield resistors. Also, in other implementations, detecting the tampering event may refer to detecting a second type of physical alteration (or modification) of the one or more metal shield resistors with a strap or a short that is coupled to the one or more metal shield resistors. The shield wiring layer along with the multiple metal shield resistors are described in greater detail herein below with reference to FIGS. 4A-4F.

Figure 2A:
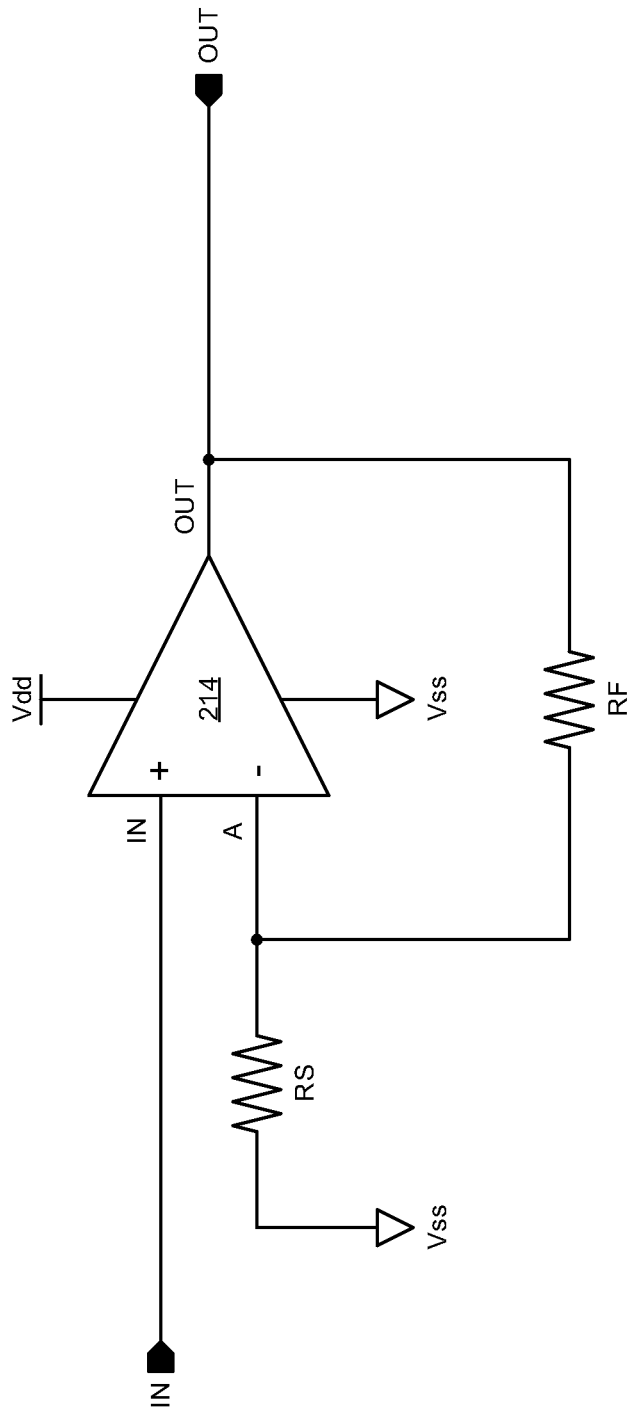
FIGS. 2A-2B illustrate varied diagrams of sensing circuitry in accordance with various implementations described herein.
Figure 2B:
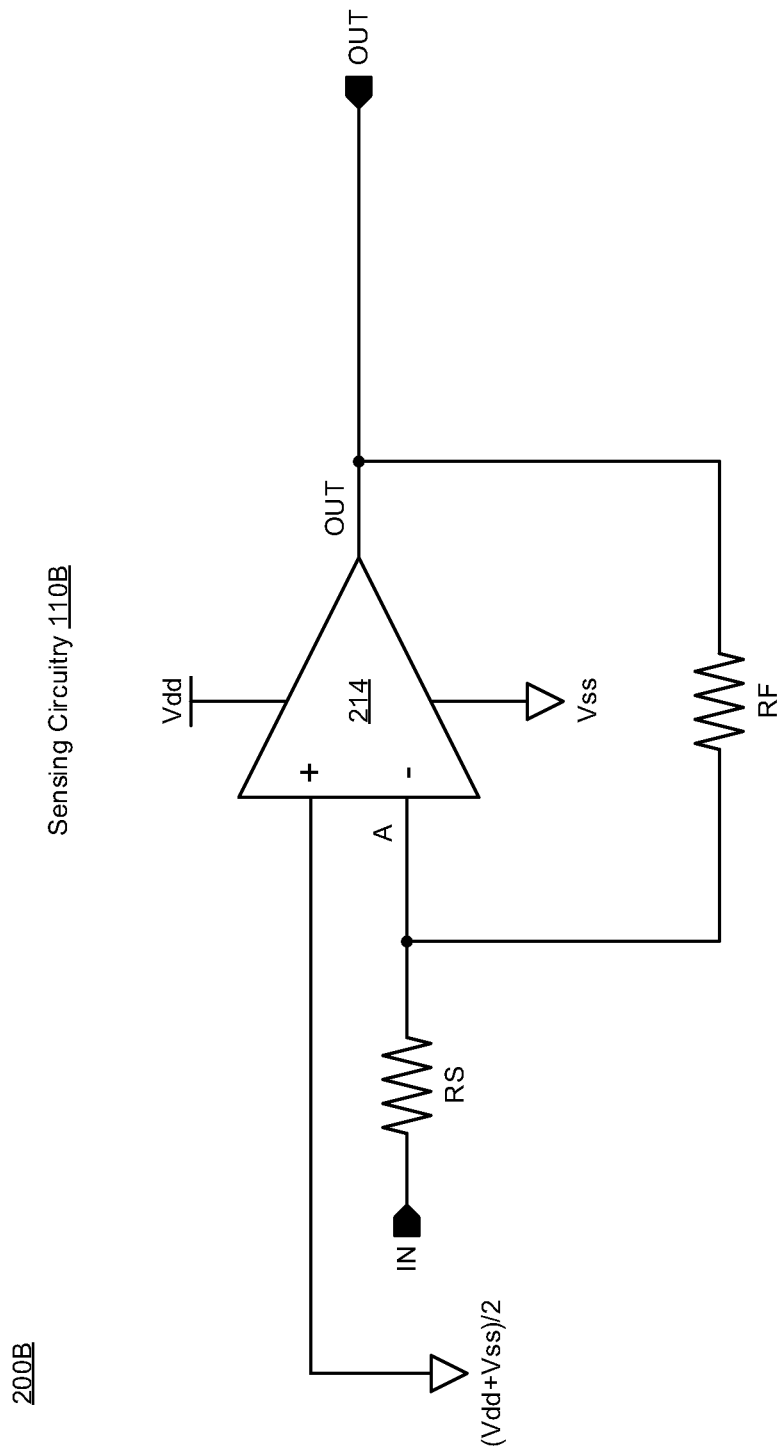

FIGS. 2A-2B illustrate varied diagrams of sensing circuitry 110 in accordance with various implementations described herein. In particular, FIG. 2A shows a diagram 200A of sensing circuitry 110A having an operational amplifier 214 in a first configuration, and alternatively, FIG. 2B shows another diagram 200B of sensing circuitry 110B having the operational amplifier 214 in a second configuration.

As shown in FIG. 2A, the sensing circuitry 110A has the operational amplifier 214 in the first configuration along with the multiple metal shield resistors (RS, RF). The operational amplifier 214 receives the input signal (IN) and provides the output signal (OUT) based on sensing a resistance differential between the multiple metal shield resistors (RS, RF). In some instances, the input signal (IN) may be received by a non-inverting input (+) of the operational amplifier 214. Also, the operational amplifier 214 may include multiple power supply connections, wherein the operational amplifier 214 may be coupled between voltage supply (Vdd) and ground (Vss).

In some instances, the multiple metal shield resistors (RS, RF) may include a first metal shield resistor (RS) and a second metal shield resistor (RF). As shown in FIG. 2A, the first metal shield resistor (RS) may be coupled between an inverting input (−) at node (A) of the operational amplifier 214 and ground (Vss), and the second metal shield resistor (RF) may be coupled between the inverting input (−) at node (A) of the operational amplifier and the output (OUT) of the operational amplifier 214. In some instances, the first metal shield resistor (RS) may refer to a first shield wire (or first wire segment) formed of a conductive material, and the second metal shield resistor (RF) may refer to a second shield wire (or second wire segment) formed of the conductive material. The conductive material may refer to metal or some other type of conductive material, and the first shield wire (RS) and the second shield wire (RF) may be formed in a same conductive layer, such as, e.g., a metal layer, which may be referred to as the shield wiring layer.

In some implementations, the operational amplifier 214 may be configured to sense a resistance differential between the multiple metal shield resistors (RS, RF) when at least one of the first shield wire (RS) and the second shield wire (RF) are/is physically altered (or modified) with a cut, a partial cut or an open formed in the conductive material, or when at least one of the first shield wire (RS) and/or the second shield wire (RF) are/is physically altered (or modified) with a strap, a short, or a probe coupled to the conductive material of the shield wiring layer.

Figure 3:
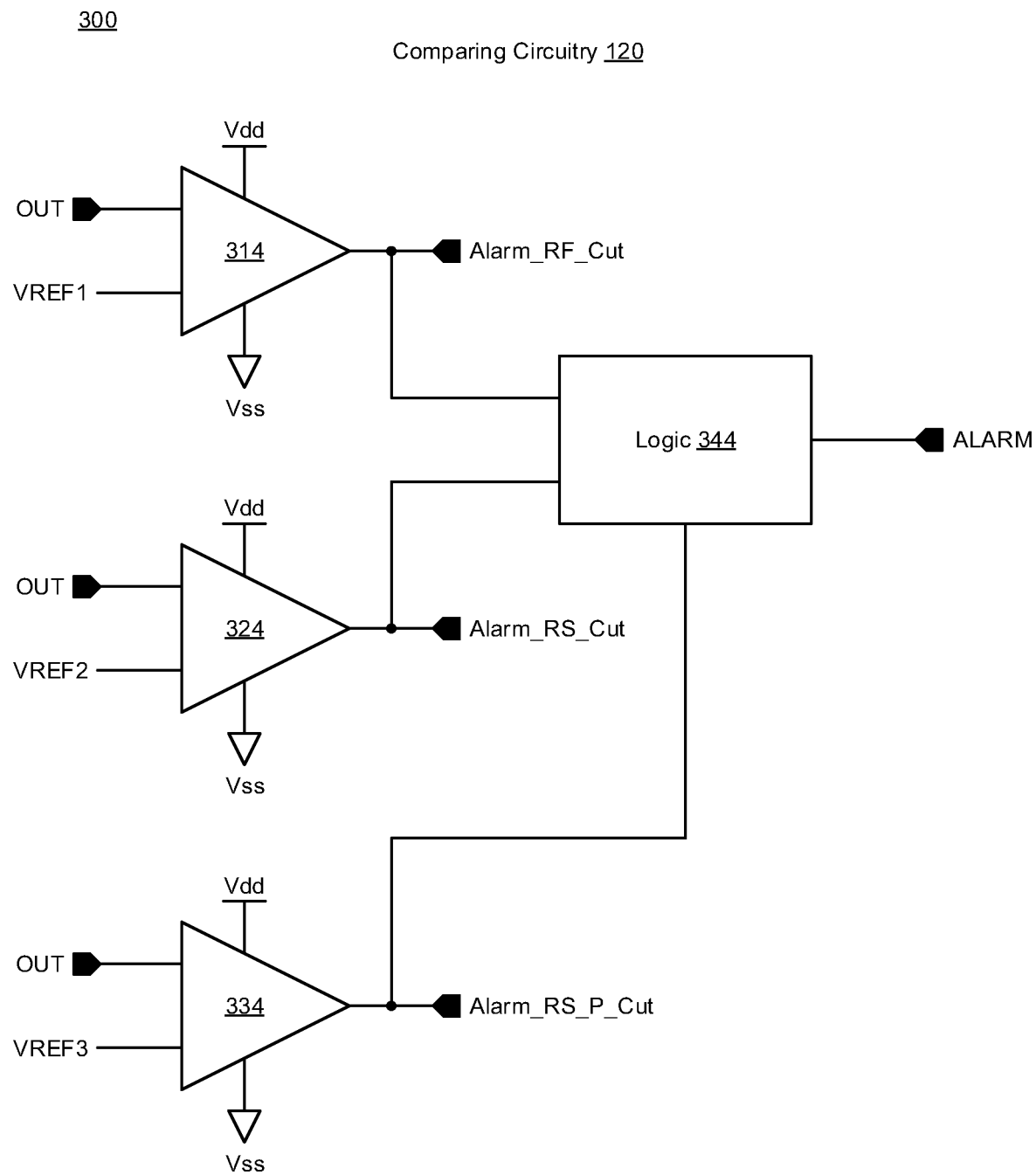
FIG. 3 illustrates a diagram of comparing circuitry in accordance with various implementations described herein.

In some instances, the sensing circuitry 110A may use the operational amplifier 214 as a non-Inverting amplifier, such that the output (OUT) of the non-Inverting amplifier may be provided to the comparing circuitry 120 in FIG. 3 for tamper detection. In some instances, the principle of tamper detection refers to configuring the amplifier gain to 2, which may be achieved by having both resistors with the same value, e.g., RS=RF.

In various implementations, the sensing circuitry 110A is configured to detect tampering events related to a full cut in RF and RS, a partial cut in RF and RS, and metal strapping in RF and RS. In reference to the sensing circuitry 110A in FIG. 2A, an output equation for the operation amplifier 214 is provided as Vout=Vin*(1+(RF/RS)), wherein resistances RF and RS are implemented in FIG. 4A, which may operate as a protective shield for protecting various circuits disposed beneath the metal wire 404 of the metal shield layer 402 (or shield wiring network).

Accordingly, based on the resistor values of RS and RF, the gain of the amplifier 214 may change, and the output voltage may change. Thus, tampering detection may be achieved by comparing output voltages. As provided herein below in FIG. 4A, resistors RS and RF may be implemented with no cut in the metal, and the resistors RS and RF may be derived from the metal routing made in the shield wiring layout. Also, as described herein below, the nodes (OUT, A, GND) are also marked and may be found as the same nets in the schematic diagram 110A of FIG. 2A.

As shown in FIG. 2B, the second configuration of the operational amplifier 214 is different than the first configuration of the operational amplifier 214 in that the non-inverting input (+) of the operational amplifier 214 may be coupled to another voltage supply (e.g., (Vdd+Vss)/2), and the inverting input (−) at node (A) may be coupled to the input (IN) via the first shield wire (RS). For instance, the first shield wire (RS) may be coupled between the input (IN) and the inverting input (−) at node (A) of the operational amplifier 214, and the second metal shield resistor (RF) may also be coupled between the inverting input (−) at node (A) of the operational amplifier and the output (OUT) of the operational amplifier 214.

In some implementations, detecting a tampering event may refer to detecting a first type of physical alteration (or modification) of the shield resistors/wires (RS, RF) with a cut, a partial cut or an open formed in the shield resistors/wires (RS, RF). Also, in other implementations, detecting the tampering event may refer to detecting a second type of physical alteration (or modification) of the shield resistors/wires (RS, RF) with a strap, a short, or a probe coupled to the shield resistors (RS/RF). The shield wiring layer along with the shield resistors/wires (RS, RF) are described herein with reference to FIGS. 4A-4F.

In various implementations, the sensing circuitry 110B may be configured to detect tampering events related to a full cut in RF and RS, a partial cut in RF and RS, and metal strapping in RF and RS. In reference to the sensing circuitry 110B in FIG. 2B, an output equation for the operation amplifier 214 may be provided as Vout=Vin*(−(RF/RS)), wherein resistances RF and RS are implemented in FIG. 4A, which may operate as a protective shield for protecting various circuits disposed beneath the metal wire 404 of the metal shield layer 402 (or shield wiring network).

FIG. 3 illustrates a diagram 300 of comparing circuitry 120 in accordance with various implementations described herein.

As shown in FIG. 3, the comparing circuitry 120 may include one or more comparators (314, 324, 334) that are arranged and configured to receive the output signal (OUT) from the sensing circuitry 110, 110A, 110B and provide the alarm signal (ALARM) based on detecting the tampering event associated with sensing the resistance differential between the multiple metal shield resistors/wires (RS, RF). The one or more comparators (314, 324, 334) may include multiple power supply connections, and also, the one or more comparators (314, 324, 334) may be coupled between Vdd and ground (Vss).

In various instances, the one or more comparators (314, 324, 334) may include a first comparator 314, a second comparator 324, and a third comparator 334. As shown in FIG. 3, the comparators (314, 324, 334) may be configured to sense a cut and/or a partial cut in at least one of the resistor/wires (RS/RF), and also, the comparators (314, 324, 334) may be configured to provide at least one alarm signal based on sensing a cut and/or a partial cut in at least one of the resistor/wires (RS/RF). In other instances, the one or more comparators (314, 324, 334) may be configured to provide at least one alarm signal when at least one of the resistor/wires (RS/RF) are strapped.

In some instances, the first comparator 314 may be configured to sense a cut in the second resistor/wire (RF), and in this instance, the first comparator 314 may receive the output signal (OUT) from the sensing circuitry 110, 110A, 110B, receive a first voltage reference signal (VREF1), and provide a first alarm signal (Alarm_RF_Cut) as an output in reference to the sensed cut to the second resistor/wire (RF).

In some instances, the second comparator 324 may be configured to sense a cut in the first resistor/wire (RS), and also, the second comparator 324 may receive the output signal (OUT) from the sensing circuitry 110, 110A, 110B, receive a second voltage reference signal (VREF2), and provide a second alarm signal (Alarm_RS_Cut) as an output in reference to the sensed cut to the first resistor/wire (RS).

In some instances, the third comparator 334 may be configured to sense a partial cut in the first resistor/wire (RS), and in this instance, the third comparator 334 may receive the output signal (OUT) from the sensing circuitry 110, 110A, 110B, receive a third voltage reference signal (VREF3), and provide a third alarm signal (Alarm_RS_P_Cut) as an output in reference to the sensed partial cut to the first resistor/wire (RS).

In various instances, the voltage reference signals (VREF1, VREF2, VREF3) may be used to provide different voltage references for comparing with the output signal (OUT) and determining a range of resistance values for identifying resistance differentials for the different alarms signals (Alarm_RF_Cut, Alarm_RS_Cut, Alarm_RS_P_Cut). The voltage levels of the voltage reference signals (VREF1, VREF2, VREF3) may be selected and/or tuned for specific predetermined thresholds that are used to generate the different alarms signals (Alarm_RF_Cut, Alarm_RS_Cut, Alarm_RS_P_Cut).

As shown in FIG. 3, the comparing circuitry 120 may also include logic 344 having one or more logic gates and related circuitry that are coupled to the one or more comparators (314, 324, 334). In some instances, the one or more comparators (314, 324, 334) and the logic 344 may be configured to receive the output signal (OUT) from the sensing circuitry 110, 110A, 110B and provide the alarm signal (ALARM) based on detecting a tampering event associated with sensing a resistance differential between the multiple metal shield resistors/wires (RS, RF).

In some instances, the multiple alarm signals (Alarm_RF_Cut, Alarm_RS_Cut, Alarm_RS_P_Cut) may be logically combined so as to provide the alarm signal (ALARM) as a single output alarm signal. For instance, as shown in FIG. 3, the logic 344 may include one or more logic gates (and related circuitry that are arranged and configured to receive the multiple alarm signals (Alarm_RF_Cut, Alarm_RS_Cut, Alarm_RS_P_Cut) from the comparators (314, 324, 334) and provide the alarm signal (ALARM) as a single output alarm signal.

Figure 4A:
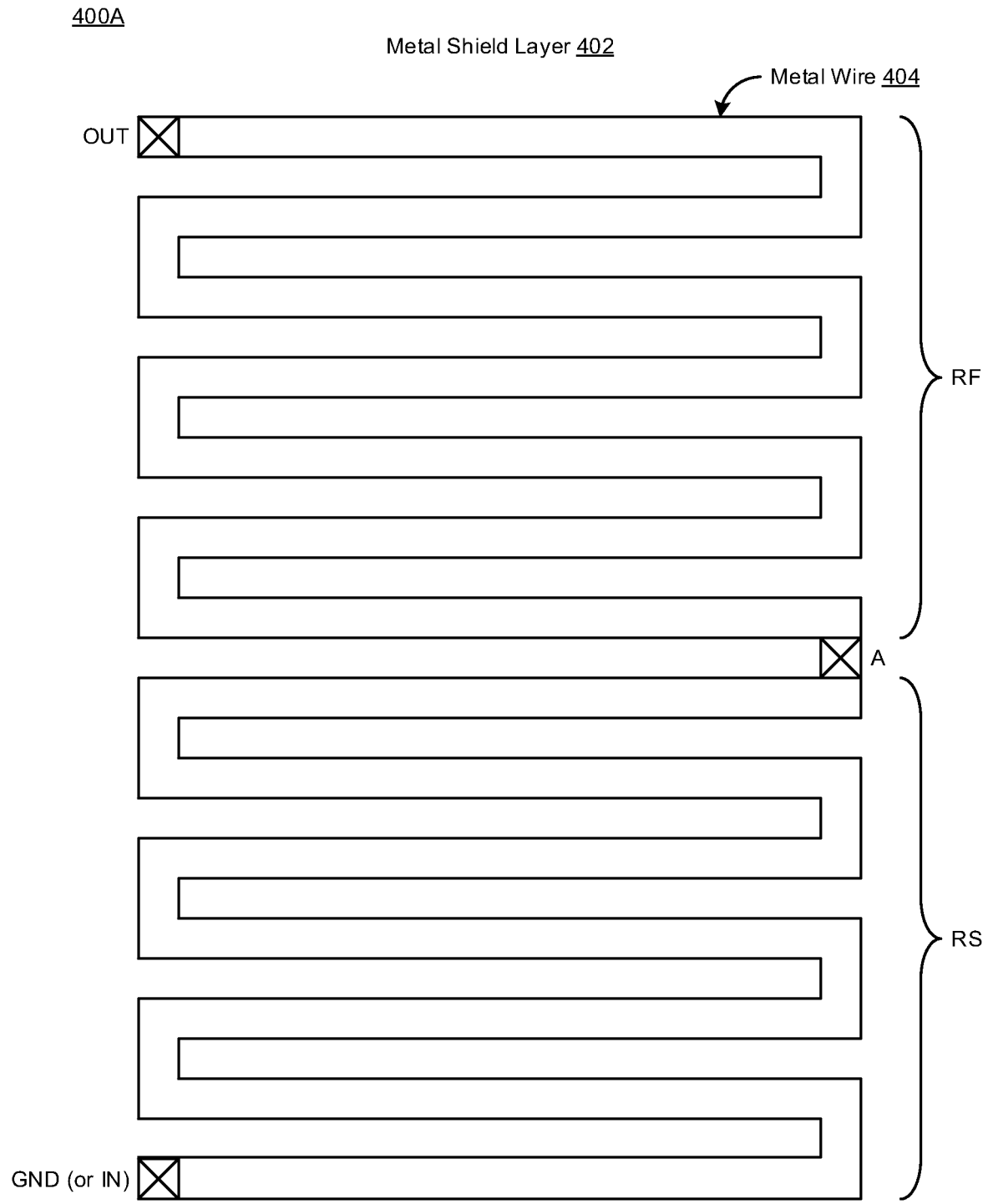
FIGS. 4A-4F illustrate various diagrams of a metal shield layer in accordance with various implementations described herein.
Figure 4B:
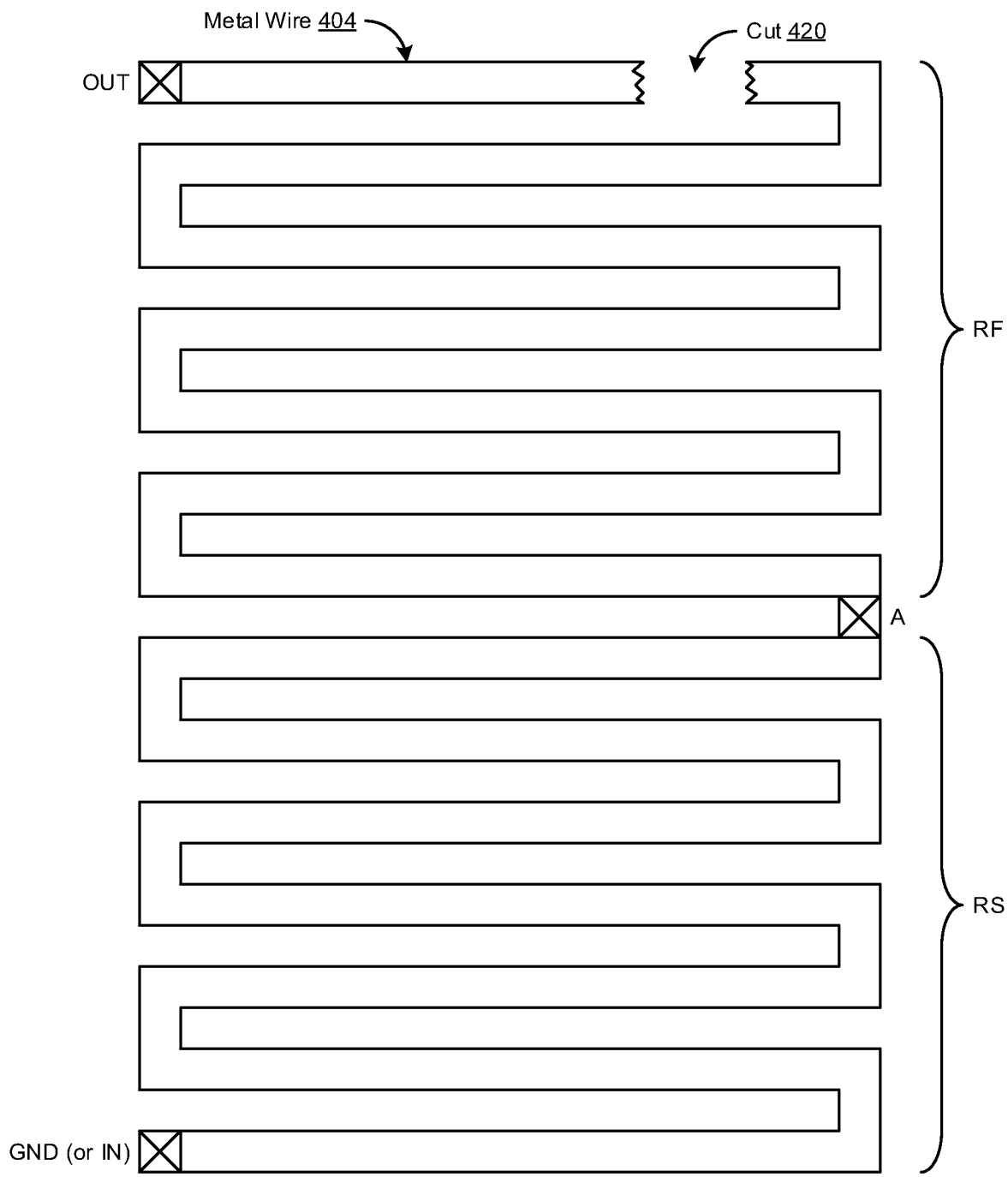
Figure 4C:
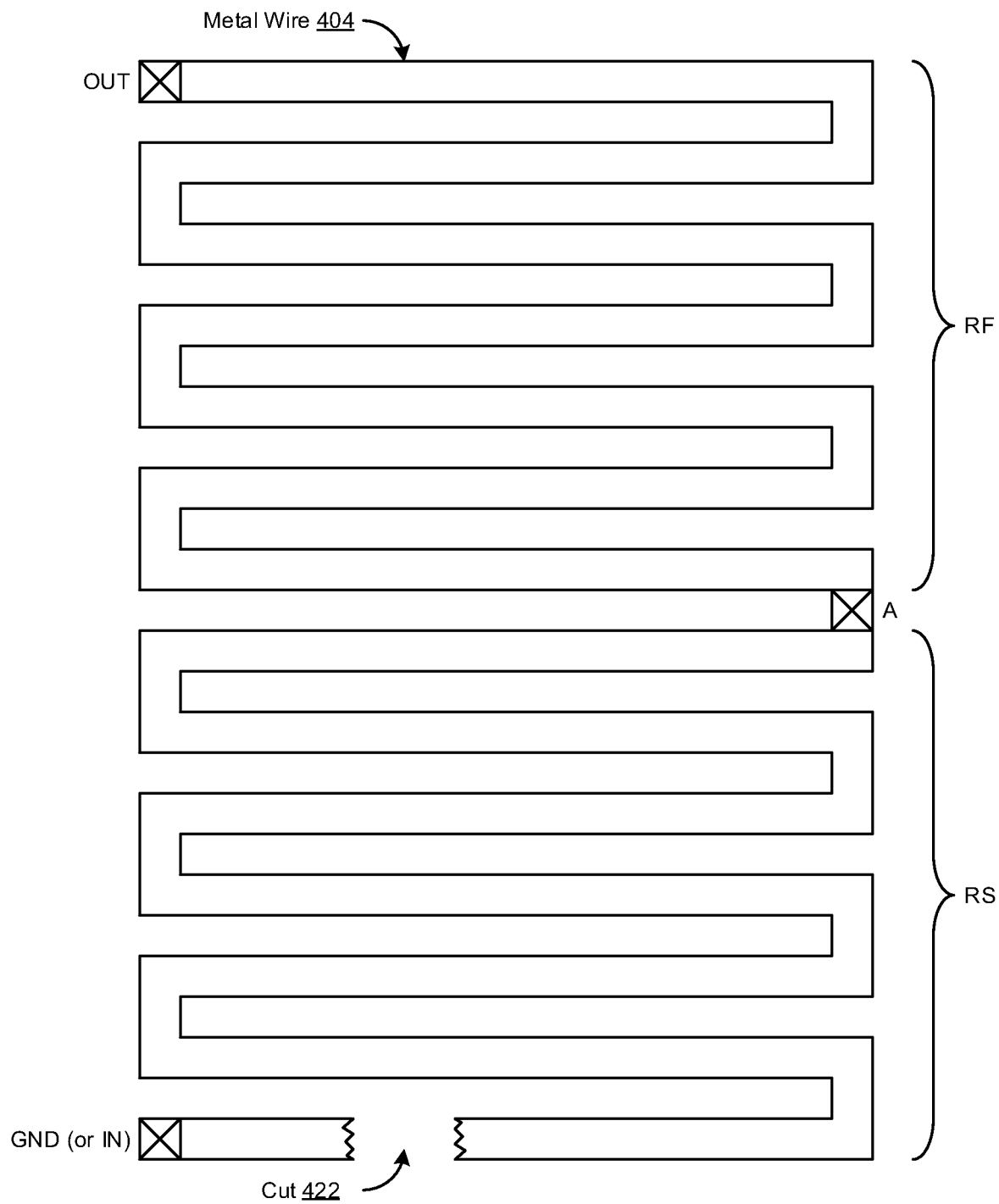
Figure 4D:
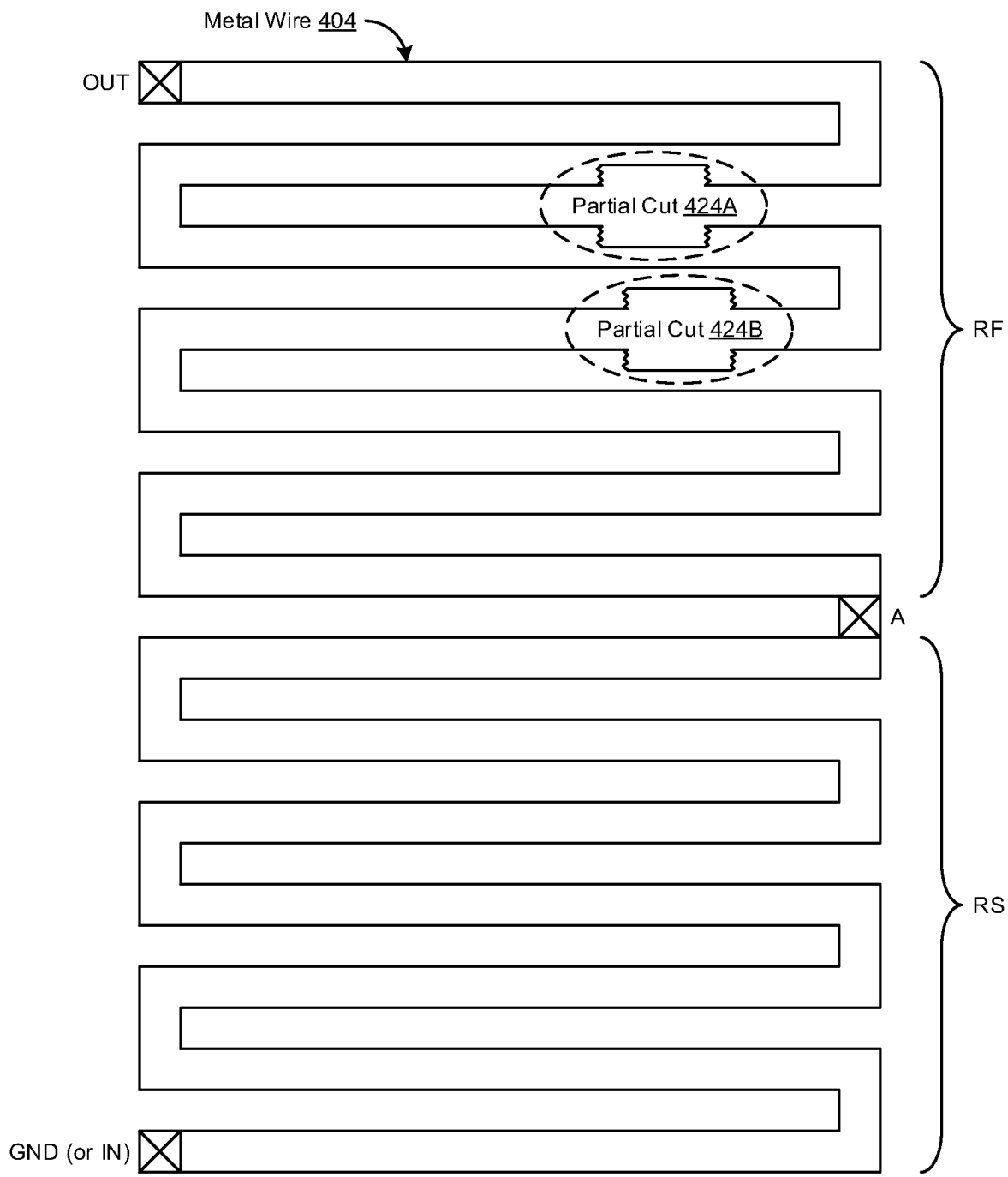
Figure 4E:
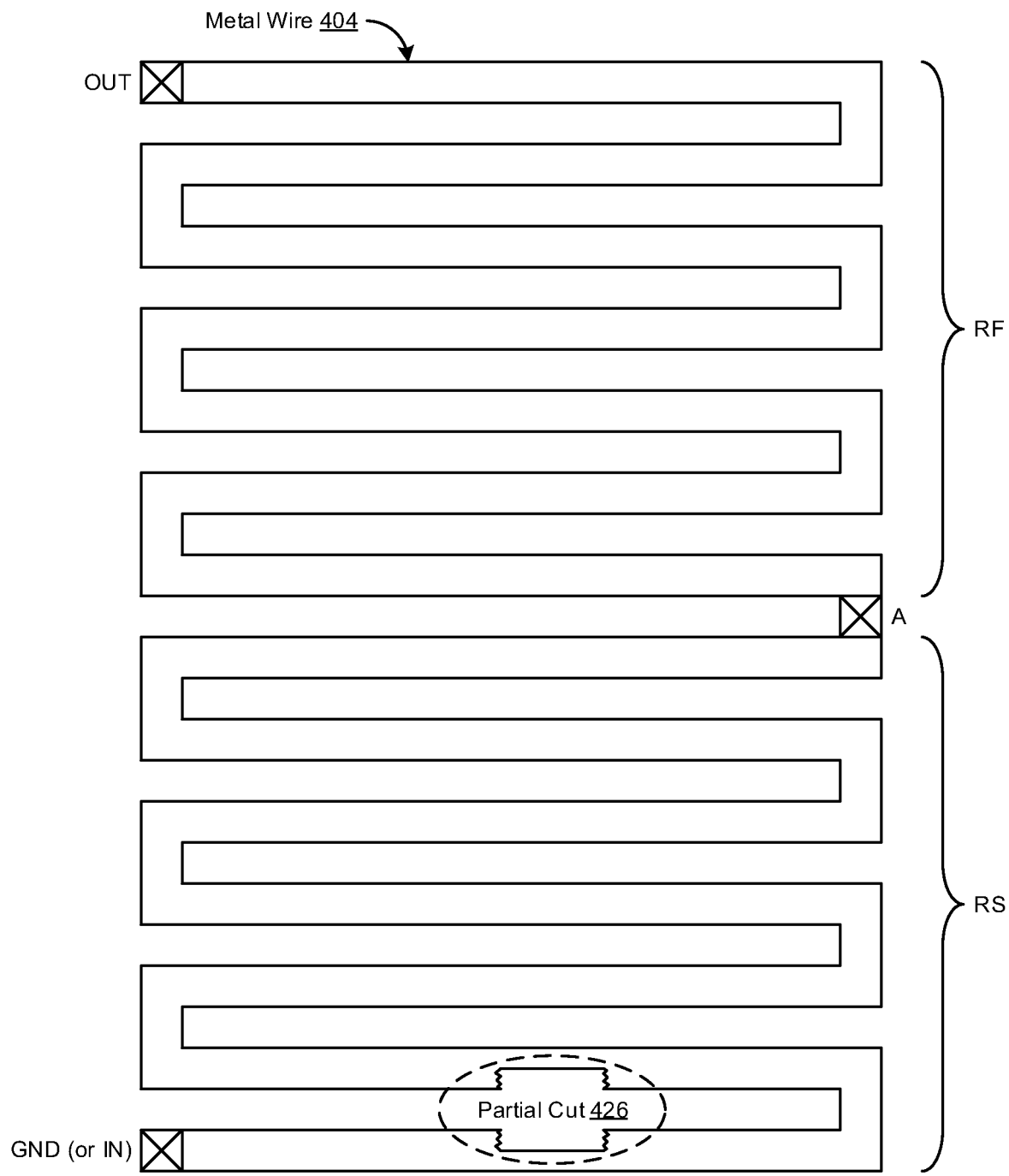
Figure 4F:
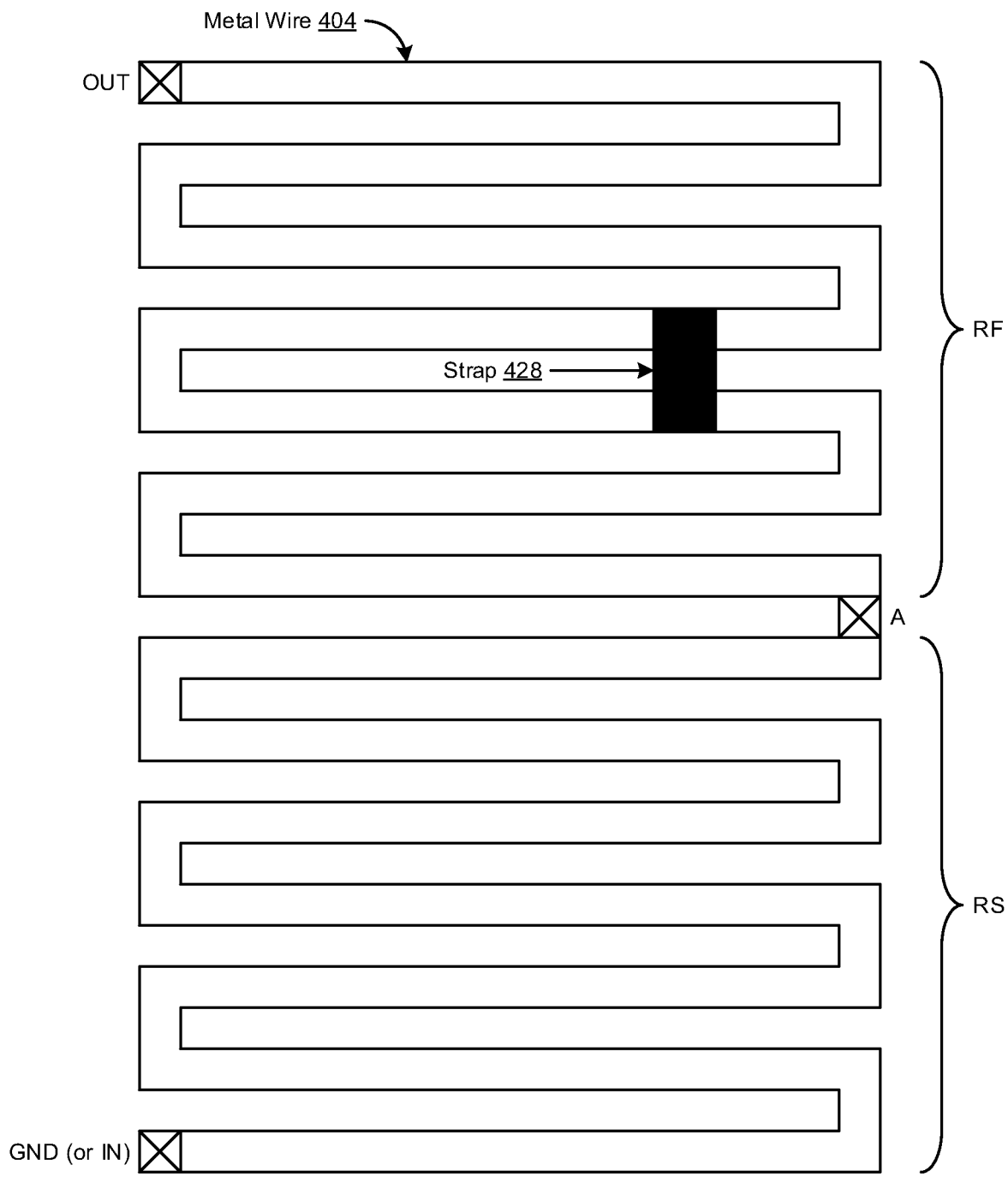

FIGS. 4A-4F illustrate various diagrams of a metal shield layer in accordance with various implementations described herein. In particular, FIG. 4A shows a diagram 400A of a metal shield layer 402 having the metal shield resistors/wires (RS, RF) as part of a metal wire 404, FIG. 4B shows a diagram 400B of the metal shield layer 402 having a cut 420 formed in the metal shield resistor/wire (RF) of the metal wire 404, and FIG. 4C shows a diagram 400C of the metal shield layer 402 having a cut 422 formed in the metal shield resistor/wire (RS) of the metal wire 404. Also, FIG. 4D shows a diagram 400D of the metal shield layer 402 having partial cuts 424A, 424B formed in the metal shield resistor/wire (RF) of the metal wire 404, FIG. 4E shows a diagram 400E of the metal shield layer 402 having a partial cut 426 formed in the metal shield resistor/wire (RS) of the metal wire 404, and FIG. 4F shows a diagram 400F of the metal shield layer 402 having a strap 428 (or short) formed in the metal shield resistor/wire (RF) of the metal wire 404. As described herein, a resistance differential between the metal shield resistors may be sensed when the first shield wire (RS) and/or the second shield wire (RF) are/is physically altered with a cut, a partial cut or an open formed in the conductive material or when the first shield wire (RS) and/or the second shield wire (RF) are/is physically altered with a strap, a short, or a probe coupled to the conductive material.

In various implementations, the metal shield layer 402 may be referred to as a shield wiring layer having the metal wire 404 as a shield wire disposed in a shield wiring network. The metal shield resistors/wires (RS/RF) include the first metal shield resistor (RS) and the second metal shield resistor (RF). The first metal shield resistor (RS) refers to a first section of the metal wire 404 coupled between the output (OUT) and the node (A) of the sensing circuitry 110, 110A, 110B, and the second metal shield resistor (RF) refers to a second section of the metal wire 404 coupled between the ground (Vss) or input (IN) and the node (A) of the sensing circuitry 110, 110A, 110B.

As shown in FIG. 4A, the metal shield wire 404 refers to a conductive shield wire having one or more wire segments (RS, RF), and the conductive shield wire is formed of a conductive material, such as, e.g., a metal material or some other type of conductive material. In some instances, the metal shield wire 404 refers to a continuous conductor having resistance and capacitance distributed along its length.

In some instances, as shown in FIG. 4B, a portion of the shield wire 404 may be severed (or altered) to form the cut 420 (or opening) in the continuous conductor, e.g., associated with the metal shield resistor/wire section (RF). In other instances, as shown in FIG. 4C, another portion of the shield wire 404 may be severed (or altered) to form the cut 422 (or opening) in the continuous conductor, e.g., associated with the metal shield resistor/wire section (RS). In these severing events, the sensing circuitry 110, 110A, 110B may be configured to sense the resistance differential developed between the multiple metal shield resistors (RS/RF) when the first shield wire (RS) and/or the second shield wire (RF) are physically severed (or altered, or modified) with the cut 420, 422 (or opening) formed in the continuous conductor.

In some instances, as shown in FIG. 4D, a portion of the shield wire 404 may be partially severed (or altered) to form one or more of the partial cuts 424A, 424B (or partial openings) in the continuous conductor, e.g., related to the metal shield resistor/wire section (RF). In other instances, as shown in FIG. 4E, another portion of the shield wire 404 may be partially severed (or altered) to form the partial cut 426 (or partial opening) in the continuous conductor, e.g., related to the metal shield resistor/wire section (RS). In these partial severing events, the sensing circuitry 110, 110A, 110B may be configured to sense the resistance differential developed between the metal shield resistors (RS/RF) when the first shield wire (RS) and/or the second shield wire (RF) are physically severed (or altered, or modified) with the partial cuts 424A, 424B, 426 (or partial openings) formed in the continuous conductor related to the shield resistor/wire sections (RS, RF).

In some instances, as shown in FIG. 4F, a portion of the shield wire 404 may be strapped, shorted, or probed (e.g., altered with a strap or short) to form the strap 428 coupled across a portion of the continuous conductor, e.g., related to the metal shield resistor/wire section (RF). In other instances, this strap 428 may be similarly formed across a portion of the metal shield resistor/wire section (RS). In these strapping or shorting events, the sensing circuitry 110, 110A, 110B may be configured to sense the resistance differential developed between the multiple metal shield resistors (RS/RF) when the first shield wire (RS) and/or the second shield wire (RF) are physically strapped or shorted (or altered, or modified) with the strap 428 (or short) formed across the continuous conductor.

In some instances, the term "cut" may refer to a full cut or open formed in a shield wire. In other instances, the term "partial cut" may refer to partial removal of a portion of a shield wire. Also, in some instances, the term "strap" may refer to a conductive short formed between multiple portions of the shield wire, or the term "strap" may refer to a conductive short formed between multiple shield wires. Moreover, in other instances, the term "probe" or "probing" may refer to an external exploration device physically touching a portion of a shield wire.

Figure 5A:
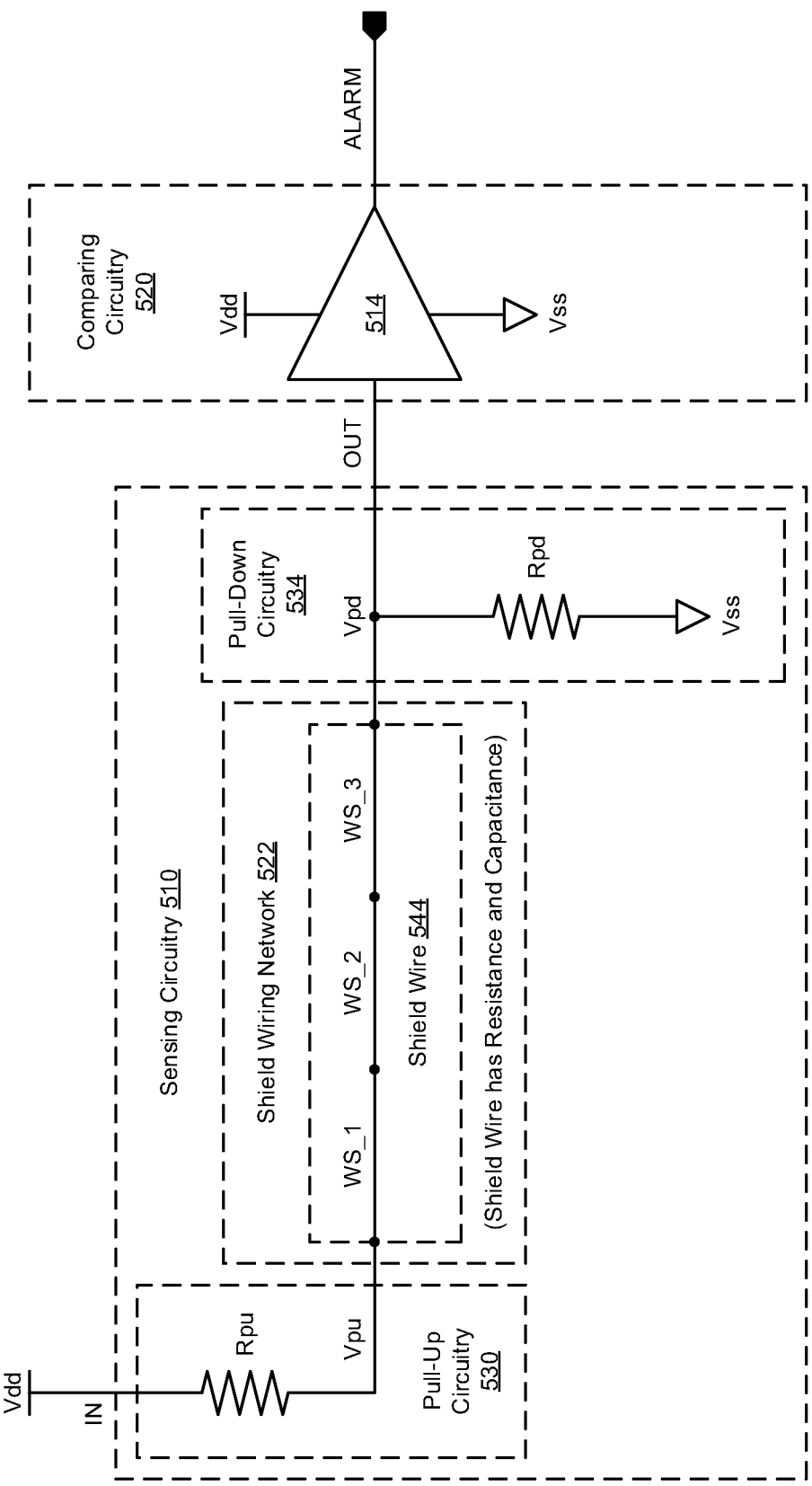
FIGS. 5A-5B illustrate various diagrams of tamper detection circuitry having shield wiring in accordance with various implementations described herein.
Figure 5B:
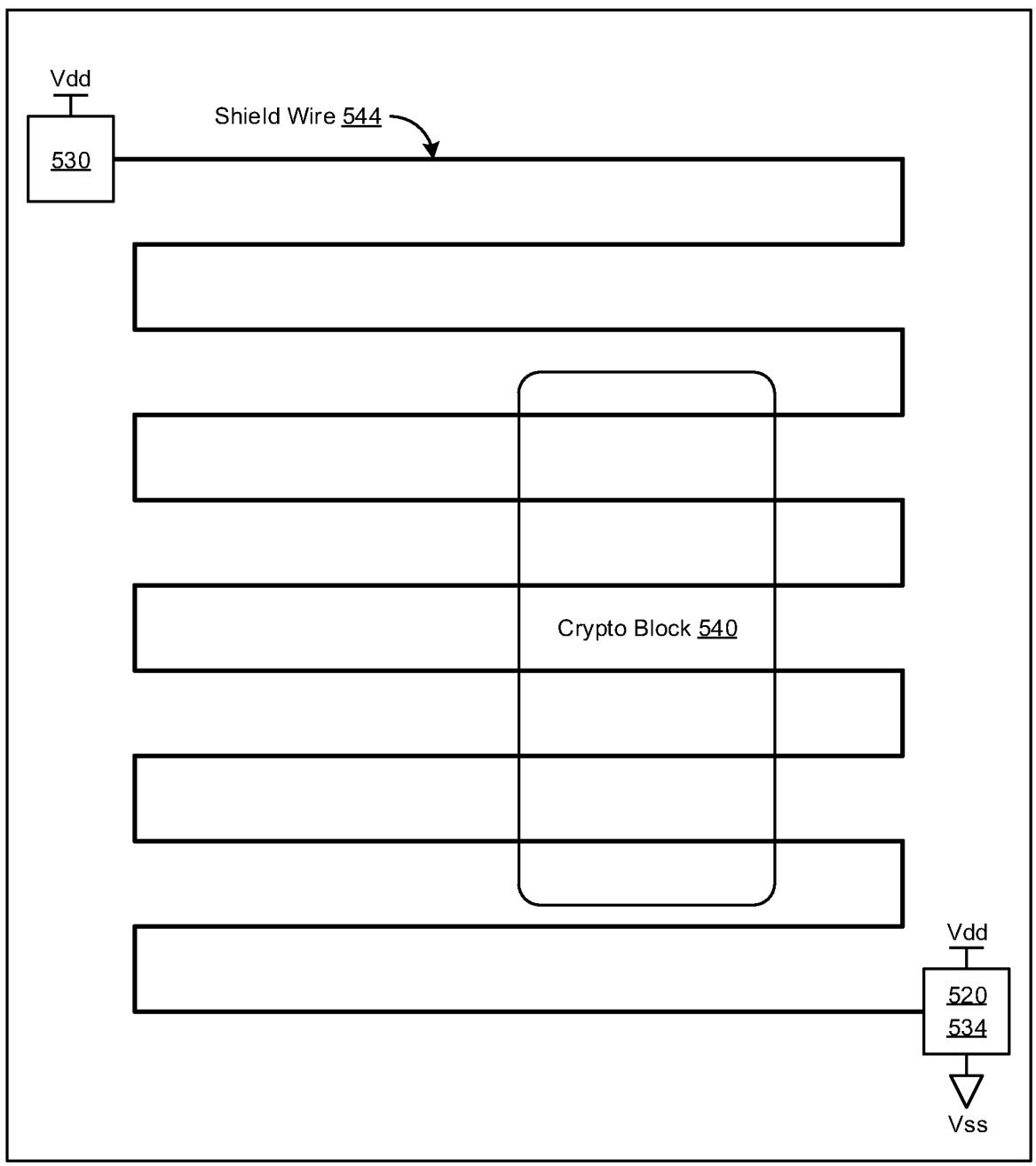

FIGS. 5A-5B illustrate various diagrams of tamper detection circuitry having shield wiring in accordance with various implementations described herein. In particular, FIG. 5A shows a diagram 500A of tamper detection circuitry 502 having sensing circuitry 510 and comparing circuitry 520, and also, FIG. 5B shows a diagram 500B of shield wiring network 522 having a shield wire 544 disposed therein.

In various instances, the tamper detection circuitry 502 may be implemented as a system or a device having various integrated circuit (IC) components that are arranged and coupled together as an assemblage or combination of parts that provide for a physical layout design and related structures. In some instances, a method of designing, providing and fabricating the tamper detection circuitry 502 as an integrated system or device may involve use of various IC circuit components described herein so as to implement various tamper detection schemes and/or techniques associated therewith. The tamper detection circuitry 502 may be integrated with various computing circuitry and related components on a single chip, and the tamper detection circuitry 502 may be implemented in embedded systems for electronic, mobile and Internet-of-things (IoT) applications.

As shown in FIG. 5A, the tamper detection circuitry 502 includes the sensing circuitry 510 that is configured to receive an input signal (IN) and provide an output signal (OUT) based on sensing a change in voltage across the shield wire 544 disposed in the shield wiring network 522. In some instances, the sensing circuitry 510 may have pull-up circuitry 530 with a pull-up resistor (Rpu) that is coupled between a voltage supply (Vdd) and an input of the shield wiring network 522, and the voltage supply (Vdd) provides the input signal (IN). Also, the sensing circuitry 510 may include pull-down circuitry 534 with a pull-down resistor (Rpd) that is coupled between an output of the shield wiring network 522 and ground (Vss), and the output of the shield wiring network 522 may be coupled to an input of the comparing circuitry 520.

In some instances, the shield wire 544 refers to a conductive shield wire having one or more wire segments (e.g., WS_1, WS_2, WS_3), and also, the conductive shield wire may be formed of a conductive material, such as, e.g., a metal material or some other conductive type of material. Also, in some instances, the shield wire 544 may refer to a continuous conductor having resistance and capacitance distributed along its length, and thus, the wire segments (e.g., WS_1, WS_2, WS_3) may include multiple wire segments that are coupled in series. In addition, the shield wiring network 522 along with the shield wire 544 are described herein with reference to FIG. 5B.

The tamper detection circuitry 502 may include comparing circuitry 520 that is configured to receive the output signal (OUT) and provide an alarm signal (ALARM) based on detecting at least one tampering event that is associated with sensing the change in voltage across the shield wire 544 of the shield wiring network 522. In some instances, the comparing circuitry 520 may have at least one comparator 514 that is configured to receive the output signal (OUT) from the sensing circuitry 510 and provide the alarm signal (ALARM) based on detecting the at least one tampering event that is associated with sensing the change in voltage across the shield wire 544. Also, in some instances, the comparator 514 may refer to a single-input (or dual-input) comparator having multiple transistors arranged and configured to receive the output signal (OUT) from the sensing circuitry 510 and then provide the alarm signal (ALARM) based on detecting the tampering event associated with sensing the change in voltage across the shield wire 544. Also, the comparator 514 may include multiple power supply connections, and in this instance, the comparator 514 may be coupled between voltage supply (Vdd) and ground (Vss).

In some instances, detecting the tampering event may refer to detecting a first type of physical alteration (or modification) of the shield wiring network 522, e.g., with a cut formed in the shield wire 544 disposed in the shield wiring network 522. Also, in other instances, detecting the tampering event may refer to detecting a second type of physical alteration (or modification) of the shield wiring network 522, e.g., with an open formed in the shield wire 544 disposed in the shield wiring network 522. The shield wiring network 522 and the shield wire 544 are described herein with reference to FIG. 5B.

As described herein, the tamper detection circuitry 502 may be configured to detect cuts in the shield wire 544. For instance, in some implementations, the shield wire 544 may be modelled using multiple cascaded stages (e.g., 3) of RC low pass filters for simplicity, wherein each wire segment (WS_1, WS_2, WS_3) may be modelled as an RC low pass filter with resistor (R) and capacitor (C) values. These modelled low pass filters are also disposed between multiple other actual lumped component resistors (Rpu, Rpd), which serve as pull-up and pull-down devices, respectively. Also, the comparing circuitry 520 may be implemented with an analog comparator, a simple inverter, a skewed inverter comparator, or similar. In various instances, a single-input comparator or a multi-input (e.g., dual-input) comparator may be used. The resistors (Rpu, Rpd) may be implemented with MOS devices or any other suitable active devices and/or topologies (e.g., CMOS resistors using PFET and/or NFET). Also, in various instances, the resistors (Rpu, Rpd) may be implemented as passive resistors (e.g., poly-Silicon, diffusion, metal, etc.) and/or as active resistors (e.g., transistor based resistors).

In some instances, the resistors (Rpu, Rpd) may be selected in such a way that when no tampering (e.g., cut) of the shield wire 544 is sensed, the node voltage (Vpd) is high enough to keep the alarm signal (ALARM) de-asserted. When the shield wire 544 is cut, the input of the comparator 514 is pulled down to ground (Vss) through the pull-down resistor (Rpd), which asserts the alarm signal (ALARM), and indicates to other systems to take counter measure actions. As described herein, each wire segment (WS_1, WS_2, WS_3) may have a resistor (R) value and a capacitor (C) value associated therewith, and to meet the sensing characteristics, the following calculations may be used.

Rpd>Rpu+(3*R), and the resistor values should satisfy the condition,

Vpd>Vref of the comparator 514 (or Vtrip, if inverter is used as comparator) in all PVT corners (i.e., process voltage temperature corners), wherein Vref refers to voltage at the reference input of the comparator 514, and wherein Vtrip refers to the input voltage at the trip point of the inverter. Also, the absolute value of Rpu and Rpd may depend on the resistance (R) value of the resistors (e.g., the R value may be low, as it is made up of highly conductive Poly-Si and/or metals).

Other choices of absolute value of Rpu and Rpd may be as follows. In some instances, a higher speed of response (e.g., refers to quick assertion of the alarm when a cut is sensed) may use lower values of resistors to decrease the RC time constant (due to parasitic components and input capacitance of the comparator), which may provide a higher speed at some cost in higher power. Thus, a higher R value of the resistors may reduce power at some cost in speed of response. In a practical scenario, invasive attacks may involve mechanical tools and/or human efforts in each step, which means a higher speed of response may not be a necessity for this application. Hence, using higher values for Rpu and Rpd may be preferable for lower power.

In reference to physical placement in an IC, for ASH based on digital logics, the logic that transmits bit patterns in the shield wire 544, and the logic that receives the bit patterns are placed close together so that the transmit (Tx) bit patterns may be compared to the receive (Rx) bit patterns. Whereas, in the novel techniques disclosed herein, there is no such constraint, as there are no bit patterns transmitted. For instance, as shown in FIG. 5B, the Rpu may be disposed at one end of a chip that is coupled to a power grid Vdd rail locally, and the Rpd along with the comparator 514 may be disposed at another end of the chip with the shield wire 544 running along the length in any pattern.

As shown in FIG. 5B, the diagram 500B shows the shield wiring network 522 with the shield wire 544 formed in a side-to-side alternating pattern (e.g., zig-zag pattern) between the pull-up circuitry 530 and the pull-down circuitry 534. In some instances, the shield wire 544 refers to a conductive shield wire having series-connected wire segments (e.g., WS_1, WS_2, WS_3) as shown in FIG. 5A, and also, the conductive shield wire may be formed of a conductive material, such as, e.g., metal material or some other type of conductive material. In some instances, as shown in FIG. 5A, the shield wire 544 may refer to a continuous conductor having resistance and capacitance distributed along its length, and also, the shield wire 544 may be formed over a crypto block 540 or some other type of protected circuit.

Figure 6A:
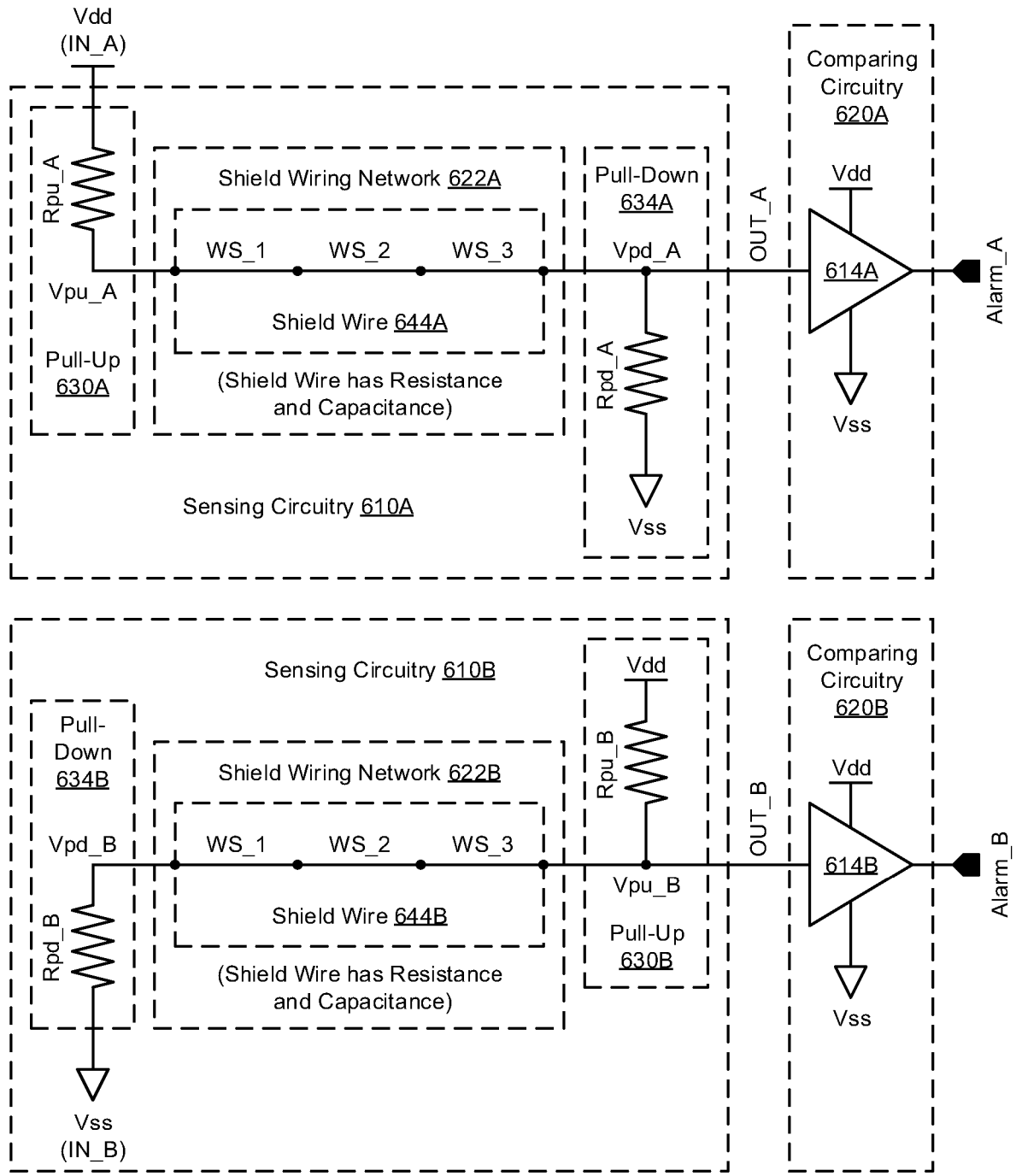
FIGS. 6A-6C illustrate various diagrams of tamper detection circuitry having shield wiring in accordance with various implementations described herein.
Figure 6B:
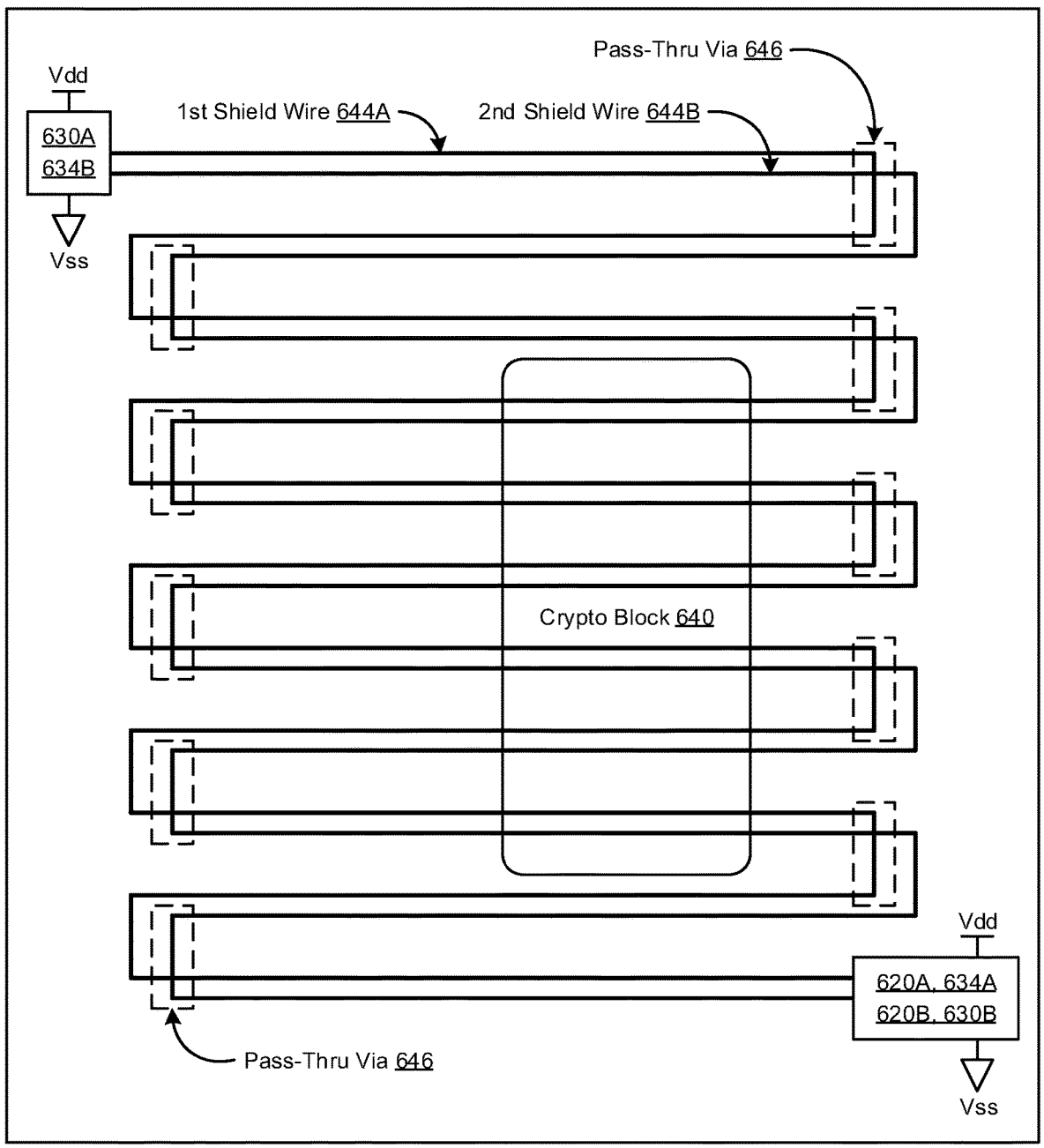
Figure 6C:
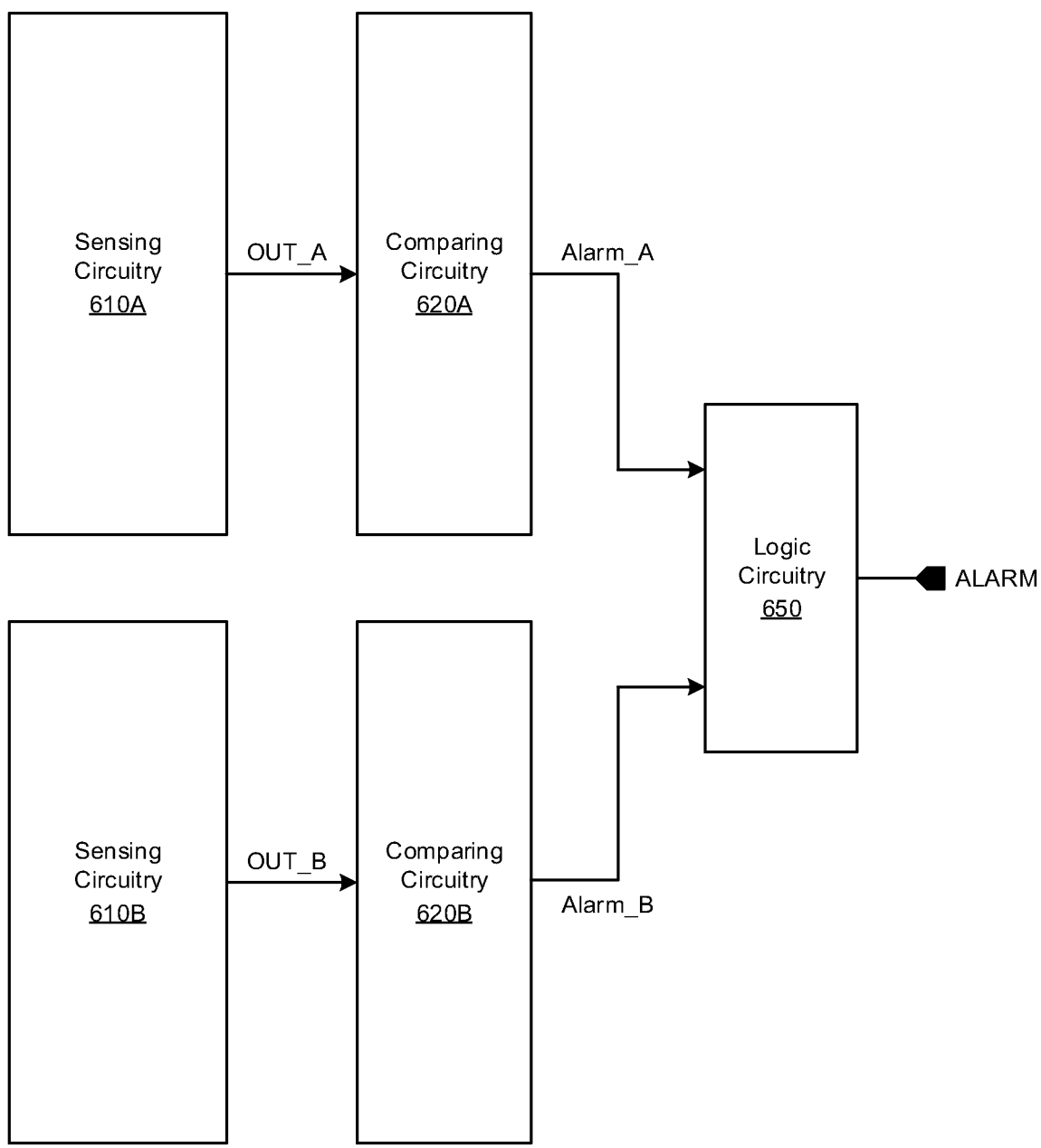

FIGS. 6A-6C illustrate various diagrams of tamper detection circuitry having shield wiring in accordance with various implementations described herein. In particular, FIG. 6A shows a diagram 600A of tamper detection circuitry 602 having sensing circuitry 610A, 610B and comparing circuitry 620A, 620B, and also, FIG. 6B shows a diagram 600B of shield wiring network 622A, 622B having corresponding shield wires 644A, 644B disposed therein. In addition, FIG. 6C shows another diagram of the tamper detection circuitry 602 having the sensing circuitry 610A, 610B and the comparing circuitry 620A, 620B along with logic circuitry 650 that is arranged and configured to receive multiple alarm signals (Alarm_A, Alarm_B) from the tamper detection circuitry 602 and provide the alarm signal (ALARM) as a single output alarm signal.

In various instances, the tamper detection circuitry 602 may be implemented as a system or a device having various integrated circuit (IC) components that are arranged and coupled together as an assemblage or combination of parts that provide for a physical layout design and related structures. In some instances, a method of designing, providing and fabricating the tamper detection circuitry 602 as an integrated system or device may involve use of various IC circuit components described herein so as to implement various tamper detection schemes and/or techniques associated therewith. The tamper detection circuitry 602 may be integrated with various computing circuitry and related components on a single chip, and the tamper detection circuitry 602 may be implemented in embedded systems for electronic, mobile and Internet-of-things (IoT) applications.

As shown in FIG. 6A, the tamper detection circuitry 602 includes first sensing circuitry 610A that may be configured to receive a first input signal (IN_A) and provide a first output signal (OUT A) based on sensing a change in voltage across a first shield wire 644A of a first shield wiring network 622A. The tamper detection circuitry 602 includes second sensing circuitry 610B that is configured to receive a second input signal (IN_B) and provide a second output signal (OUT B) based on sensing a change in voltage across a second shield wire 644B of a second shield wiring network 622B.

In some instances, the first sensing circuitry 610A has first pull-up circuitry 630A with a first pull-up resistor (Rpu_A) that is coupled between a voltage supply (Vdd) and an input of the first shield wiring network 622A, and the voltage supply (Vdd) provides the first input signal (IN_A). Also, the first sensing circuitry 610A may include first pull-down circuitry 634A with a first pull-down resistor (Rpd_A) that is coupled between an output of the first shield wiring network 622A and ground (Vss), and the output of the first shield wiring network 622A may be coupled to an input of the first comparing circuitry 620A.

In some instances, the first shield wire 644A refers to a conductive shield wire having one or more wire segments (e.g., WS_1, WS_2, WS_3), and also, the conductive shield wire may be formed of conductive material, such as, e.g., a metal material or some other conductive type of material. Also, in some instances, the first shield wire 644A may refer to a continuous conductor having resistance and capacitance distributed along its length, and thus, the wire segments (e.g., WS_1, WS_2, WS_3) may include multiple wire segments that are coupled in series. In addition, the first shield wiring network 622A along with the first shield wire 644A are described herein with reference to FIG. 6B.

In some instances, the second sensing circuitry 610B includes second pull-up circuitry 630B with a second pull-up resistor (Rpu_B) that is coupled between the voltage supply (Vdd) and an input of the second shield wiring network 622B, and also, the voltage supply (Vdd) provides the second input signal (IN_B). Also, the second sensing circuitry 610B includes second pull-down circuitry 634B with a second pull-down resistor (Rpd_B) that is coupled between an output of the second shield wiring network 622B and ground (Vss), and the output of the second shield wiring network 622B may be coupled to an input of the second comparing circuitry 620B.

In some instances, the second shield wire 644B may refer to a conductive shield wire having one or more wire segments (e.g., WS_1, WS_2, WS_3), and the conductive shield wire may be formed of conductive material, such as, e.g., a metal material or some other conductive type of material. Also, in some instances, the second shield wire 644B may refer to a continuous conductor having resistance and capacitance distributed along its length, and thus, the wire segments (e.g., WS_1, WS_2, WS_3) may include multiple wire segments that are coupled in series. The second shield wiring network 622B along with the second shield wire 644B are described herein with reference to FIG. 6B.

The tamper detection circuitry 602 includes first comparing circuitry 620A having a first comparator 614A that is configured to receive the first output signal (OUT_A) from the first sensing circuitry 610A and provide a first alarm signal (Alarm_A) based on detecting a first tampering event that is associated with sensing the change in voltage across the first shield wire 644A of the first shield wiring network 622A. Also, the tamper detection circuitry 602 may include second comparing circuitry 610B having a second comparator 614B that is configured to receive the second output signal (OUT_B) and provide a second alarm signal (Alarm_B) based on detecting a second tampering event that is associated with sensing the change in voltage across the second shield wire 644B of the second shield wiring network 522B.

As shown in FIG. 6B, the diagram 600B of shield wiring network 622A, 622B has corresponding shield wires 644A, 644B formed in side-to-side alternating patterns (e.g., zig-zag patterns) between the pull-up circuitry 630A, 630B and the pull-down circuitry 634A, 634B. In some instances, the shield wires 644 may refer to multiple shield wires including, e.g., a first shield wire 644A and a second shield wire 644B.

The first shield wire 644A may refer to a first conductive shield wire having the series-connected wire segments (e.g., WS_1, WS_2, WS_3) shown in FIG. 6A, and also, the first conductive shield wire may be formed of conductive material, such as, e.g., a metal material or some other type of conductive material. In some implementations, the first shield wire 644A may refer to a first continuous conductor having first resistance and capacitance distributed along its length, and the first shield wire 644A may be formed over a crypto block 640 or some other type of protected circuit.

Also, the second shield wire 644B may refer to a second conductive shield wire having series-connected wire segments (e.g., WS_1, WS_2, WS_3) shown in FIG. 6A, and also, the second conductive shield wire may be formed of a conductive material, such as, e.g., metal material or some other type of conductive material. In some instances, the second shield wire 644B may refer to a second continuous conductor having other second resistance and capacitance distributed along its length, and the second shield wire 644B may be formed over a crypto block 640 or some other type of protected circuit.

In addition, as shown in FIG. 6B, the second shield wire 644B may be routed to pass through another layer by way of pass-thru vias 646 that allow for the second shield wire 644B to form the continuous conductor along its length. As such, in this instance, the continuous conductor of the second shield wire 644B may pass over and also cross over the first shield wire 644A when alternating in an opposite direction from a previous wiring segment or section. Also, the pass-thru vias 646 allow for continuity of form, while passing over and crossing over in the side-to-side alternating pattern.

In reference to FIGS. 6A-6B, the tamper detection circuitry 602 may provide for detecting straps using multiple cut sensing circuits, e.g., as provided in FIG. 5A. For instance, as shown in FIG. 6B, two separate ASH shield wires 644A, 644B may be laid physically side-by-side. If a strap occurs between the two shield wires 644A, 644B, there will be some change in the input of comparator 514 for detection. This is achieved by having different potentials in each of the shield wires 644A, 644B. In some instances, a short, a connection, or probing between the two shield wires 644A, 644B alters the potential at their respective comparator inputs, if a potential difference between the two shield wires 644A, 644B are kept high during normal operating conditions (i.e., before a tampering attack). Also, the tamper detection circuitry 602 detects both cuts and straps using two separate ASH circuits 622A, 622B, wherein each one detects cuts in their shield wires 644A, 644B, and wherein together they detect a strap between their shield wires 644A, 644B. The first shield wire 644A may be the same as FIG. 5A, and the second shield wire 644B may be complementary to 644A. In addition, probing will also cause strapping temporarily, and thus, probing will also be detected by these circuits.

In reference to detecting a strap attack, Vpd_A may be at a higher voltage than Vpu_B, and when a strap, a connection, or probing is made between the two shield wires 644A, 644B, the potential tends to become equal or at least the difference becomes smaller. This results in drop of Vpd_A and rise of Vpu_B (although this may not occur in reference to Vdd and Vss, but to some in-between value). Usually, strapping lines are of smaller lengths and have lower resistance, which may be used to alter voltages in the shield wires 644A, 644B and also the sensing voltages. For responsive changes in the node voltages (Vpd_A, Vpu_B) due to strap attack, resistance values of the lumped resistors (Rpu, Rpd) may be much larger than the resistance values of the shield wires 644A, 644B. By choosing higher values for Rup_A, Rpd_A, Rup_B and Rpd_B as greater than R, the sensing voltages (i.e., input to the comparators 614A, 614B) may become largely dependent on lumped resistor ratios than shield wire resistance. This may ensure that a successful strap detection is sensed, even when the strapping points in shield wires 644A, 644B are not of the same distance along the length of the wires; i.e., the strap may be disposed between any point on the first shield wire 644A to any other point on the second shield wire 644B. This change in Vpd_A and Vpu_B may be detected using the comparators 614A, 614B to generate the alarm signals (Alarm_A, Alarms_B). The final alarm signal (e.g., ALARM) may be a logic gated output of Alarm_A and Alarm_B, e.g., as shown in FIG. 6C. In addition, in some instances, probing will also cause strapping temporarily, and thus, probing will also be detected by these circuits.

As shown in the diagram 600C of FIG. 6C, the tamper detection circuitry 602 may include logic circuitry 650 coupled to the comparing circuitry 620A, 620B. In some instances, the comparing circuitry 620A, 620B may be configured to receive the multiple output signals (OUT_A, OUT_B) from the sensing circuitry 610A, 610B and provide the multiple alarm signals (Alarm_A, Alarm_B) to the logic circuitry 650 based on detecting at least one tampering event associated with sensing a change in voltage in at least one of the metal shield wires (644A, 644B). The logic circuitry 650 may receive the multiple alarm signals (Alarm_A, Alarm_B) from the sensing circuitry 610A, 610B and provide the alarm signal (ALARM) as a single output alarm signal. In some implementations, the logic circuitry 650 may logically combine the multiple alarm signals (Alarm_A, Alarm_B) so as to provide the alarm signal (ALARM) as a single output alarm signal.

FIGS. 7A-7B illustrate various diagrams of comparators in accordance with various implementations described herein. In particular, FIG. 7A shows a diagram 700A of a first comparator 614A having a first transistor configuration, and FIG. 7B shows a diagram 700B of a second comparator 614B having a second transistor configuration. In some instances, the first transistor configuration of the first comparator 614A may also be used in the comparator 514 of FIG. 5A. Also, in various instances, any one or more of the comparators 514, 614A, 614B may be configured as a single-input comparator or as a multi-input comparator, such as, e.g., a dual-input comparator.

As shown in FIG. 7A, the first comparator 614A may have at least one p-type transistor (e.g., P0) that is coupled between the voltage supply (Vdd) and a number (N) of n-type transistors (e.g., N0, N1, N2, N3, . . . , NN). Also, the n-type transistors (e.g., N0, N1, N2, N3, . . . , NN) may be series-connected between the at least one p-type transistor (e.g., P0) and ground (Vss). In some instances, a bulk terminal of the at least one p-type transistor (e.g., P0) may be tied or coupled to Vdd, and similarly, the bulk terminals of the n-type transistors (e.g., N0, N1, N2, N3, . . . , NN) may be tied or coupled to Vss. Also, the first output signal (OUT_A) may be coupled to the gates of transistors (e.g., P0 and N0, N1, N2, N3, . . . , NN), and the first alarm signal (Alarm_A) may be taken from a first output node that is disposed between transistor (P0) and transistor (N0).

As shown in FIG. 7B, the second comparator 614B may have a number (N) of p-type transistors (e.g., P0, P1, P2, P3, . . . , PN) that are coupled between the voltage supply (Vdd) and at least one n-type transistor (e.g., N0). The p-type transistors (e.g., P0, P1, P2, P3, . . . , PN) may be series-connected between Vdd and the at least one n-type transistor (e.g., N0), which is coupled between transistor (PN) and ground (Vss). In some instances, the bulk terminals of the p-type transistors (e.g., P0, P1, P2, P3, . . . , PN) may be tied or coupled to Vdd, and the bulk terminal of the at least one n-type transistor (e.g., N0) may be tied or coupled to Vss. The second output signal (OUT_B) may be coupled to the gates of transistors (e.g., P0, P1, P2, P3, . . . , PN and N0), and also, the second alarm signal (Alarm_B) may be taken from a second output node that is disposed between transistor (PN) and transistor (N0).

In reference to security, the activated shield wire may be used to protect side channel attack (SCA) resistant cryptography logics from physical tamper attacks. In some instances, SCA resistance may be achieved by using a special type of power converter to power a crypto system, which may protect crypto logic from SCA, such as, e.g., power and electromagnetic (EM) attacks. For instance, a shield wire may be laid over SCA resistant crypto logic in the IC, and the electrical signals of the crypto logic (which refer to functions of their operations) are coupled to the shield wire, which may result as current variation in the shield wire circuits. These currents may be exploited by power attacks. If the shield wire is a low power and low complexity circuit, then the shield wire may be easily powered by the same special type of power converters that power the crypto logic without any considerable overhead. Hence, any coupling to the shield wire from the crypto logic is held within the same power domain of the crypto logic, which may be difficult to exploit by power analysis attacks. One condition may refer to having shield wires disposed at lower levels of metal with top layers used to route other signals and power. Also, due to the simplicity of this circuit, the shield wires may be easily integrated in a physical layout along with the SCA resistant crypto logic. Further, current flow due to coupling effect and overall power consumption of the shield wires disclosed herein may be reduced by simply increasing the resistance (R) values of Rpu_A, Rpd_A, Rpu_B and/or Rpd_B. In some instances, this increase in the resistance may reduce their electromagnetic signatures (due to reduced current), which may further assist with protection from EM attacks.

Figure 8:
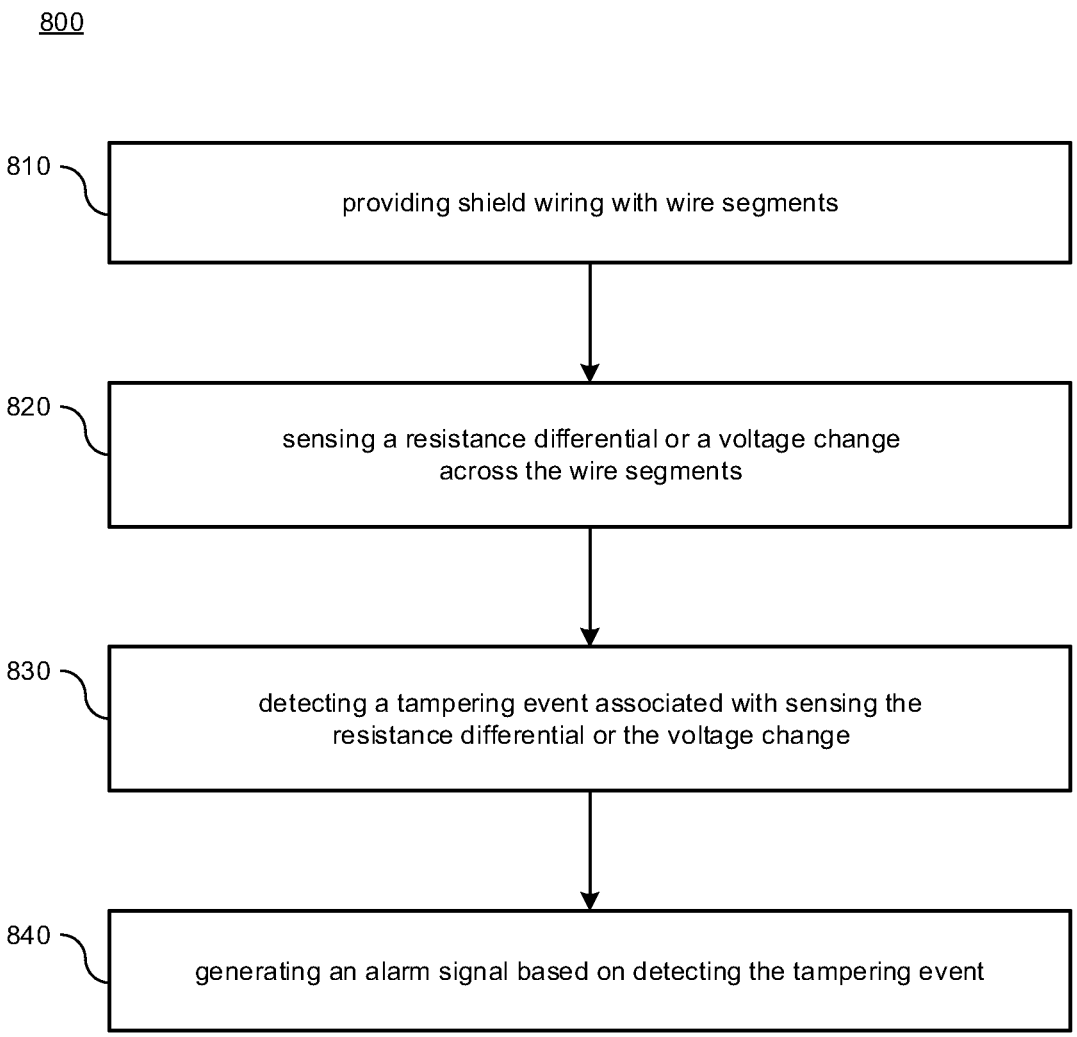
FIG. 8 illustrates a process flow diagram of a method for performing tamper detection techniques in accordance with implementations described herein.

FIG. 8 illustrates a process diagram of a method 800 for performing tamper detection techniques in accordance with implementations described herein.

It should be understood that even though method 800 may indicate a particular order of operation execution, in some cases, portions of operations may be executed in a different order, and on different systems. Also, additional operations and/or steps may be added to and/or omitted from method 800. In various instances, method 800 may be implemented in hardware and/or software. If implemented in hardware, method 800 may be implemented with various components and/or circuitry, as described in reference to FIGS. 1-7B. If implemented in software, method 800 may be implemented with various programs and/or software instruction processes that are configured for the various tamper detection schemes and techniques, as described herein. In addition, if implemented in software, various instructions related to implementing method 800 may be stored and/or recorded in memory and/or a database. In other instances, a computer or various other types of computing devices having at least one processor and memory may be configured to perform the various operations and/or steps of method 800.

In various implementations, method 800 may refer to a method of designing, providing, building, fabricating and/or manufacturing various tamper detection circuitry as an integrated system, device and/or circuit that may involve use of the various IC circuit components as described herein so as to implement various tamper detection schemes and techniques associated therewith. In various instances, the tamper detection circuitry may be integrated with computing circuitry and related components on a single chip, and the tamper detection circuitry may be implemented in embedded systems for electronic, mobile and Internet-of-things (IoT) applications, including sensor nodes.

As shown in FIG. 8, at block 810, method 800 may provide shield wiring with one or more wire segments. At block 820, method 800 may sense a resistance differential and/or a voltage change across the one or more wire segments. At block 830, method 800 may detect at least one tampering event associated with the sensing of the resistance differential and/or the voltage change. At block 840, method 800 may generate at least one alarm signal based on detecting the at least one tampering event.

In reference to the tamper detection circuitry of FIGS. 1-4F, method 800 may be configured to use sensing circuitry that receives an input signal and provides an output signal based on sensing the resistance differential of the shield wiring between multiple metal shield resistors (i.e., the wire segments with resistance values). Also, method 800 may be configured to use comparing circuitry that receives the output signal from the sensing circuitry and provides the at least one alarm signal based on detecting the at least one tampering event associated with the resistance differential.

In reference to the tamper detection circuitry of FIGS. 5A-5B, method 800 may be configured to use sensing circuitry that receives an input signal and provides an output signal based on sensing a change in voltage across the shield wiring having a shield wire (with the wire segments) of a shield wiring network. Also, method 800 may be configured to use comparing circuitry that receives the output signal from the sensing circuitry and provides the at least one alarm signal based on detecting the at least one tampering event that is associated with sensing the change in voltage across the shield wire.

In reference to the tamper detection circuitry of FIGS. 6A-6C, method 800 may utilize first sensing circuitry that receives a first input signal and provides a first output signal based on sensing a change in voltage across a first shield wire (having first wire segments) of a first shield wiring network. Also, method 800 may utilize first comparing circuitry that receives the first output signal and provides a first alarm signal based on detecting a first tampering event associated with sensing the change in voltage across the first shield wire of the first shield wiring network. Also, method 800 may utilize second sensing circuitry that receives a second input signal and provides a second output signal based on sensing a change in voltage across a second shield wire (having second wire segments) of a second shield wiring network. In addition, method 800 may utilize second comparing circuitry that receives the second output signal and provides a second alarm signal based on detecting a second tampering event associated with sensing the change in voltage across the second shield wire of the second shield wiring network.

The various implementations described herein are directed to various tamper detection schemes and techniques that provide for various advantages. For instance, the schemes and techniques described herein do not rely on the use of any clock on the data steam for tamper detection. The current consumption may be less since the speed of the operational amplifier and/or the comparator may be significantly low, and less bandwidth may be needed. Also, there may be no need for any other extra protection when there is an intervening means to couple any disconnected metal externally to overcome changes in resistance when an alarm is generated. These techniques may be implemented easily, and only the tap points on the metal should be taken accurately.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Also, it should be appreciated that such a development effort may be complex and time consuming, but would nevertheless be a routine undertaking of design, fabrication, and manufacture for those of ordinary skill having benefit of this disclosure.

Described herein are various implementations of a device. The device may include sensing circuitry that receives an input signal and provides an output signal based on sensing a resistance differential between multiple metal shield resistors. The device may include comparing circuitry that receives the output signal and provides an alarm signal based on detecting a tampering event associated with the resistance differential.

Described herein are various implementations of a device. The device may include sensing circuitry that receives an input signal and provides an output signal based on sensing a change in voltage across a shield wire of a shield wiring network. The device may include comparing circuitry that receives the output signal and provides an alarm signal based on detecting a tampering event that is associated with sensing the change in voltage across the shield wire.

Described herein are various implementations of a device. The device may include first sensing circuitry that receives a first input signal and provides a first output signal based on sensing a change in voltage across a first shield wire of a first shield wiring network. The device may include first comparing circuitry that receives the first output signal and provides a first alarm signal based on detecting a first tampering event associated with sensing the change in voltage across the first shield wire of the first shield wiring network. The device may include second sensing circuitry that receives a second input signal and provides a second output signal based on sensing a change in voltage across a second shield wire of a second shield wiring network. The device may include second comparing circuitry that receives the second output signal and provides a second alarm signal based on detecting a second tampering event associated with sensing the change in voltage across the second shield wire of the second shield wiring network.

Described herein are various implementations of a method. The method may include providing shield wiring with wire segments. The method may include sensing a resistance differential or a voltage change across the wire segments. The method may include detecting a tampering event associated with at least one of a cut, an open, a strap, a short, and probing in reference to sensing the resistance differential or the voltage change. The method may include generating an alarm signal based on detecting the tampering event.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device, comprising:
    sensing circuitry that receives an input signal and provides an output signal based on sensing a resistance differential between multiple metal shield resistors; and
    comparing circuitry that receives the output signal and provides an alarm signal based on detecting a tampering event associated with the resistance differential,
    wherein the sensing circuitry has an operational amplifier and the multiple metal shield resistors that are configured to receive the input signal and provide the output signal based on sensing the resistance differential between the multiple metal shield resistors,
    wherein the multiple metal shield resistors have a first metal shield resistor and a second metal shield resistor,
    wherein the first metal shield resistor is coupled between an inverting input of the operational amplifier and ground, and
    wherein the second metal shield resistor is coupled between the inverting input of the operational amplifier and an output of the operational amplifier.

2. The device of claim 1, wherein the first metal shield resistor refers to a first shield wire formed of a conductive material, and wherein the second metal shield resistor refers to a second shield wire formed of the conductive material.

3. The device of claim 2, wherein the conductive material is metal, and wherein the first shield wire and the second shield wire are formed in a same metal layer.

4. The device of claim 2, wherein the operational amplifier is configured to sense the resistance differential between the multiple metal shield resistors when at least one of the first shield wire and the second shield wire is physically altered with a cut, a partial cut or an open formed in the conductive material or when at least one of the first shield wire and the second shield wire is physically altered with a strap or a short coupled to the conductive material.

5. The device of claim 1, wherein the comparing circuitry has one or more comparators configured to receive the output signal from the sensing circuitry and provide the alarm signal based on detecting the tampering event associated with sensing the resistance differential between the multiple metal shield resistors.

6. The device of claim 5, wherein the comparing circuitry has one or more logic gates coupled to the one or more comparators, and wherein the one or more comparators and the one or more logic gates are configured to receive the output signal from the sensing circuitry and provide the alarm signal based on detecting the tampering event associated with sensing the resistance differential between the multiple metal shield resistors.

7. The device of claim 1, wherein detecting the tampering event refers to detecting a first physical alteration of the multiple metal shield resistors with a cut, a partial cut or an open formed in one or more metal shield resistors of the multiple metal shield resistors or detecting a second physical alteration of the one or more metal shield resistors of the multiple metal shield resistors with a strap or a short coupled to the one or more metal shield resistors of the multiple metal shield resistors.

8. A method, comprising:
    providing shield wiring with wire segments;
    coupling one wire segment of the wire segments to an inverting input of an operational amplifier;
    coupling another wire segment of the wire segments between the inverting input and an output of the operational amplifier;
    sensing a resistance differential or a voltage change across the wire segments with the operational amplifier;
    detecting a tampering event associated with at least one of a cut, an open, a strap, a short, and probing in reference to sensing the resistance differential or the voltage change; and
    generating an alarm signal based on detecting the tampering event.

9. A method comprising:
providing shield wiring with wire segments;
coupling the wire segments to an operational amplifier;
sensing a resistance differential or a voltage change across the wire segments with the operational amplifier;
detecting a tampering event associated with at least one of a cut, an open, a strap, a short, and probing in reference to sensing the resistance differential or the voltage change; and
generating an alarm signal based on detecting the tampering event,
wherein coupling the wire segments to the operational amplifier includes:
  coupling a first wire segment of the wire segments between an inverting input of the operational amplifier and ground, and
  coupling a second wire segment of the wire segments between the inverting input of the operational amplifier and an output of the operational amplifier.

* * * * *